US007308408B1

(12) United States Patent
Stifelman et al.

(10) Patent No.: US 7,308,408 B1
(45) Date of Patent: Dec. 11, 2007

(54) PROVIDING SERVICES FOR AN INFORMATION PROCESSING SYSTEM USING AN AUDIO INTERFACE

(75) Inventors: Lisa Joy Stifelman, Mountain View, CA (US); Hadi Partovi, San Francisco, CA (US); Haleh Partovi, Hillsborough, CA (US); David Bryan Alpert, Mountain View, CA (US); Matthew Talin Marx, Mountain View, CA (US); Scott James Bailey, Santa Cruz, CA (US); Kyle D. Sims, Mountain View, CA (US); Darby McDonough Bailey, Santa Cruz, CA (US); Roderick Steven Brathwaite, Livermore, CA (US); Eugene Koh, Palo Alto, CA (US); Angus Macdonald Davis, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 8 days.

(21) Appl. No.: 10/955,216

(22) Filed: Sep. 29, 2004

Related U.S. Application Data

(62) Division of application No. 09/638,263, filed on Aug. 11, 2000, now Pat. No. 7,143,039.

(60) Provisional application No. 60/220,457, filed on Jul. 24, 2000.

(51) Int. Cl.
*G10L 13/00* (2006.01)

(52) U.S. Cl. ........................ 704/266; 704/277; 704/278

(58) Field of Classification Search ................ 704/258, 704/265, 277, 278
See application file for complete search history.

(56) References Cited

U.S. PATENT DOCUMENTS

| | | | | |
|---|---|---|---|---|
| 5,283,888 | A | 2/1994 | Dao | |
| 5,566,272 | A | 10/1996 | Brems et al. | |
| 5,664,126 | A * | 9/1997 | Hirakawa et al. | 715/751 |
| 5,745,877 | A | 4/1998 | Nijmam | |
| 5,771,276 | A | 6/1998 | Wolf | |
| 5,774,859 | A | 6/1998 | Houser et al. | |
| 5,787,414 | A | 7/1998 | Miike et al. | |
| 5,822,405 | A | 10/1998 | Astarabadi | |
| 5,844,158 | A | 12/1998 | Butler et al. | |
| 5,873,064 | A | 2/1999 | De Armas | |
| 5,875,429 | A | 2/1999 | Douglas | |
| 5,878,118 | A | 3/1999 | Mohr | |
| 5,884,262 | A | 3/1999 | Wise et al. | |
| 5,884,265 | A | 3/1999 | Squitteri | |
| 5,903,867 | A | 5/1999 | Watari et al. | |
| 5,915,001 | A | 6/1999 | Uppaluru | |
| 5,953,392 | A | 9/1999 | Rhic | |
| 5,953,700 | A | 9/1999 | Kanevsky et al. | |
| 5,960,394 | A | 9/1999 | Gould et al. | |
| 5,983,187 | A | 11/1999 | Haddock | |
| 6,014,428 | A | 1/2000 | Wolf | |
| 6,026,153 | A | 2/2000 | Fuller et al. | |
| 6,067,348 | A | 5/2000 | Hibbeler | |
| 6,144,939 | A * | 11/2000 | Pearson et al. | 704/258 |
| 6,185,535 | B1 | 2/2001 | Hedin et al. | |
| 6,204,862 | B1 * | 3/2001 | Barstow et al. | 345/473 |
| 6,411,932 | B1 * | 6/2002 | Molnar et al. | 704/260 |
| 6,453,164 | B1 | 9/2002 | Fuller et al. | |
| 6,484,263 | B1 | 11/2002 | Liu | |
| 6,505,161 | B1 | 1/2003 | Brems | |
| 6,732,078 | B1 | 5/2004 | Luomi et al. | |
| 6,807,574 | B1 | 10/2004 | Partovi et al. | |
| 6,810,378 | B2 * | 10/2004 | Kochanski et al. | 704/258 |
| 6,873,952 | B1 | 3/2005 | Bailey et al. | |
| 6,970,915 | B1 | 11/2005 | Partovi et al. | |
| 7,047,194 | B1 * | 5/2006 | Buskies | 704/258 |
| 2003/0147518 | A1 | 8/2003 | Albal et al. | |

FOREIGN PATENT DOCUMENTS

| | | |
|---|---|---|
| EP | 0 889 627 | 1/1999 |

320

WO WO 98/56154 12/1998

OTHER PUBLICATIONS

B Mazor et al., "The Design Of Speech-Interactive Dialogs For Transaction-Automation Systems", Feb. 17, 1995, GTE Laboratories Inc., 40 Sylvan Rd. Waltham MA 02254, USA, pp. 313-320.
Gardener-Bonneau, "Human Factors and Voice Interactive Systems," 1999, Kluwer Academic Publishers, 101 Philip Dr., Norwell, MA 02061 USA, 21 pages.
Mazor et al., "Oasis- A Speech Recognition System for Telephone Service Orders," Sep. 18-22, 1994, GTE Laboratories Inc., 40 Sylvan Rd. Waltham MA 02254, USA, pp. 679-682.
Hemphill et al., "Speech-Aware Multimedia," Spring 1996, IEEE Multimedia, pp. 74-79.
Lau et al., "Webgalaxy: Beyond Point and Click- A Conversational To A Browser," 1997, Computer Networks and ISDN Systems 29, pp. 1385-1393.
"VOXML 1.0 Application Development Guide," Sep. 1998, Motorola, Inc., Consumer Applications and Services Division, 55 Shurman Blvd., Ste 600, Naperville, IL 60563 USA, 33 pages.
Hemphill et al., "Surfing the Web By Voice," Nov. 1995, ACM Multimedia '95, San Francisco, CA, pp. 215-223.
J. Markowitz, "Using Speech Recognition," 1996, Prentice-Hall Inc., Upper Saddle River, NJ 07458, 313 pages.
T.V. Raman, Cascaded Speech Style Sheets, Sep. 1997, Computer Networks and ISDN Systems, vol. 29, Nos., pp. 8-13.
Kondo et al., "Surfin' the World Wide Web with Japanese," 1997,1997 IEEE International Conference on Acoustics, Speech, and Signal Processing, pp. 1151-1155.
Rudnicky et al., "Spoken Language Recognition in an Office Management Domain," 1991, ICASSP 91, vol. 2, pp. 829-833.
VoiceXML Forum, "Voice eXtensible Markup Language (VoiceXML)-Technical Background," copyright AT&T (1999), printed from website www.vxmlforum.org/tech_bkgrnd.html Aug. 17, 1999, 3 pages.
Hindus et al., "Capturing, Structuring, and Representing Ubiquitous Audio," ACM Transaction on Information Systems, vol. 11, No. 4, Oct. 1993, pp. 376-400.
"GALAXY-II: A Reference Architecture For Conversational System Development," Stephanie Seneff et al., technical paper, Massachusetts Institute of Technology (1998), 4 pages.
"Voice Augmented Menu Automated Telephone Response System," Feb. 1995, IBM Technical Disclosure Bulletin, 3 pages.
"Integrated Audio-Graphics User Interface," Apr. 1991, IBM Technical Disclosure Bulletin, 2 pages.
"Ubiquitous Audio: Capturing Spontaneous Collaboration," Hindus et al., Proceedings of the Conference on Computer-Supported Cooperative Work, Nov. 1992, pp. 210-217.
Chris Schmandt, "Phoneshell: The Telephone as Computer Terminal," 1993, Conference on Multimedia '93, pp. 373-382.
"HyperVoice-A Phone-Based CSCW Platform," Resnick, P., Proceedings of the Conference on Computer-Supported Cooperative Work, Nov. 1992, pp. 218-225.
Paul Resnick, "Phone-Based CSCW: Tools and Trials," ACM Transactions on Information Systems, vol. 11, No. 4, Oct. 1993, pp. 218-226.
Resnick et al., "Skip and Scan: Cleaning Up Telephone Interfaces," May 1992, CHI '92, Conference Proceedings, pp. 401-424.
"A Form-Based Dialogue Manager For Spoken Language Applications," David Goddeau et al., Proceedings Fourth Intl. Conf. on Spoken Language Processing (ICSLP '96), Oct. 1996, pp. 701-704.
Co-pending U.S. Appl. No. 09/638,263, filed Aug. 11, 2000, entitled "Method and System for Providing Menu and Other Services for an Information Processing System Using a Telephone or Other Audio Interface," by Lisa Stifelman et al.
Co-pending U.S. Appl. No. 10/993,752, filed Nov. 19, 2004, entitled "Method and System for Providing Menu and Other Services for an Information Processing System Using a Telephone or Other Audio Interface," by Lisa Stifelman et al.
Co-pending U.S. Appl. No. 09/466,236, filed Dec. 17, 1999, entitled "Method and Apparatus for Electronic Commerce Using a Telephone Interface," by Partovi et al.
Co-pending U.S. Appl. No. 09/431,002, filed Nov. 1, 1999, entitled "Streaming Content Over a Telephone Interface," by Partovi, et al.

* cited by examiner

*Primary Examiner*—Michael Opsasnick
(74) *Attorney, Agent, or Firm*—Perkins Coie LLP

(57) ABSTRACT

A method and system for providing efficient menu services for an information processing system that uses a telephone or other form of audio user interface. In one embodiment, the menu services provide effective support for novice users by providing a full listing of available keywords and rotating house advertisements which inform novice users of potential features and information. For experienced users, cues are rendered so that at any time the user can say a desired keyword to invoke the corresponding application. The menu is flat to facilitate its usage. Full keyword listings are rendered after the user is given a brief cue to say a keyword. Service messages rotate words and word prosody. When listening to receive information from the user, after the user has been cued, soft background music or other audible signals are rendered to inform the user that a response may now be spoken to the service. Other embodiments determine default cities, on which to report information, based on characteristics of the caller or based on cities that were previously selected by the caller. Other embodiments provide speech concatenation processes that have co-articulation and real-time subject-matter-based word selection which generate human sounding speech. Other embodiments reduce the occurrences of falsely triggered barge-ins during content delivery by only allowing interruption for certain special words. Other embodiments offer special services and modes for calls having voice recognition trouble. The special services are entered after predetermined criterion have been met by the call. Other embodiments provide special mechanisms for automatically recovering the address of a caller.

20 Claims, 23 Drawing Sheets

310

| DIFFERENT WORD TABLE |
|---|
| GREETINGS 310(1) |
| WELCOME 310(2) |
| HI THERE 310(3) |
| HELLO 310(4) |
| HI 310(5) |
| HELLO THERE 310(6) |
| * * * 310(n) |

| DIFFERENT PROSODY, SAME WORD TABLE |
| --- |
| WELCOME TO TELLME1 312(1) |
| WELCOME TO TELLME2 312(2) |
| WELCOME TO TELLME3 312(3) |
| WELCOME TO TELLME4 312(4) |
| WELCOME TO TELLME5 312(5) |
| WELCOME TO TELLME6 312(6) |
| * * * 312(n) |

| GAME IN PROGRESS: | | | |
|---|---|---|---|
| LARGE DIFFERENCE | AVERAGE DIFFERENCE | VERY SMALL DIFFERENCE | |
| ARE CRUSHING | ARE BEATING | ARE NUDGING | (1) |
| ARE PUNISHING | ARE LEADING | ARE SQUEAKING BY | (2) |
| ARE STOMPING | ARE AHEAD OF | ARE BARELY OVER | (3) |
| ARE SQUASHING | ARE OVER | ARE JUST AHEAD OF | (4) |

| GAME OVER: | | | |
|---|---|---|---|
| LARGE DIFFERENCE | AVERAGE DIFFERENCE | VERY SMALL DIFFERENCE | |
| CRUSHED | BEAT | NUDGED BY | (1) |
| PUNISHED | WON | SQUEAKED BY | (2) |
| STOMPED | FINISHED AHEAD OF | BARELY BEAT | (3) |
| SQUASHED | WERE OVER | JUST BEAT | (4) |

394 → SERIES VERB; 396 → SERIES NAME

| SERIES VERB | SERIES NAME | |
|---|---|---|
| CLINCHING | THE STANLEY CUP | (1) |
| LEADING | THE WESTERN FINALS | (2) |
| WINNING | THE EASTERN SEMI-FINALS | (3) |
| AHEAD IN | THE AFC FINALS | (4) |
| CRUSHING | THE NFC FINALS | (5) |
| NARROWLY LEADING | THE WORLD SERIES | (6) |

FIGURE 8

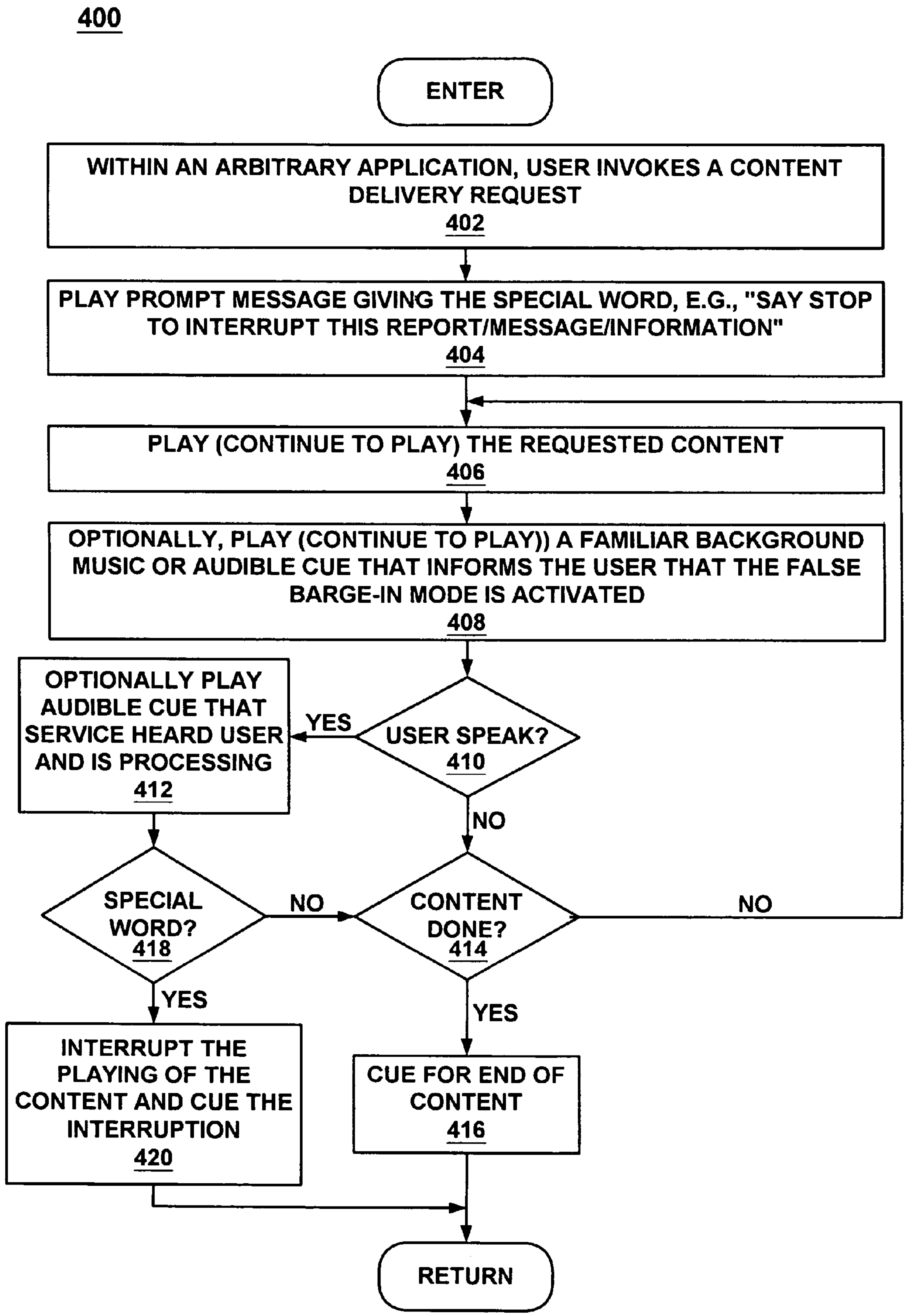

```
ENTER
  ↓
┌─────────────────────────────────────────────────────────┐
│ WITHIN AN ARBITRARY APPLICATION, USER INVOKES A CONTENT │
│                   DELIVERY REQUEST                      │
│                         402                             │
└─────────────────────────────────────────────────────────┘
  ↓
┌─────────────────────────────────────────────────────────┐
│ PLAY PROMPT MESSAGE GIVING THE SPECIAL WORD, E.G., "SAY │
│   STOP TO INTERRUPT THIS REPORT/MESSAGE/INFORMATION"    │
│                         404                             │
└─────────────────────────────────────────────────────────┘
  ↓
┌─────────────────────────────────────────────────────────┐
│        PLAY (CONTINUE TO PLAY) THE REQUESTED CONTENT    │
│                         406                             │
└─────────────────────────────────────────────────────────┘
  ↓
┌─────────────────────────────────────────────────────────┐
│ OPTIONALLY, PLAY (CONTINUE TO PLAY)) A FAMILIAR         │
│ BACKGROUND MUSIC OR AUDIBLE CUE THAT INFORMS THE USER   │
│ THAT THE FALSE BARGE-IN MODE IS ACTIVATED               │
│                         408                             │
└─────────────────────────────────────────────────────────┘
```

- USER SPEAK? 410
  - YES → OPTIONALLY PLAY AUDIBLE CUE THAT SERVICE HEARD USER AND IS PROCESSING 412
    - SPECIAL WORD? 418
      - YES → INTERRUPT THE PLAYING OF THE CONTENT AND CUE THE INTERRUPTION 420 → RETURN
      - NO → CONTENT DONE? 414
  - NO → CONTENT DONE? 414
    - YES → CUE FOR END OF CONTENT 416 → RETURN
    - NO → (loop back to 406)

450

```
┌─────────────────────────┐
│   ENTER MOVIES          │
│   APPLICATION           │
└───────────┬─────────────┘
            ▼
┌───────────────────────────────────────────────────────────┐
│ PLAY MESSAGE THAT DEFAULT CITY AND STATE HAS BEEN SELECTED│
│ AND THAT MOVIES WILL BE SELECTED FROM THIS DEFAULT, E.G., │
│ "OKAY, LET'S LOOK FOR MOVIES IN SAN JOSE, CALIFORNIA"     │
│                         452                               │
└───────────────────────────┬───────────────────────────────┘
                            ▼
┌───────────────────────────────────────────────────────────┐
│ PLAY MESSAGE THAT DEFAULT CAN BE CHANGED, E.G., "OR, TO FIND│
│ OUT ABOUT MOVIES IN ANOTHER CITY, SAY THE CITY AND STATE" │
│                         454                               │
└───────────────────────────┬───────────────────────────────┘
                            ▼
┌───────────────────────────────────────────────────────────┐
│      PLAY CUE MUSIC FOR A BRIEF TIME AND LISTEN FOR USER  │
│                         456                               │
└───────────────────────────┬───────────────────────────────┘
                            ▼
                    ╱ DEFAULT  ╲
          NO      ╱  REPLACED BY ╲    YES
       ◄────────   NEW?            ────────►
                ╲   458          ╱
                  ╲            ╱
```

- NO → PLAY MOVIE INFO FOR DEFAULT CITY 460
- YES → PLAY MOVIE INFO FOR THE NEW CITY 462

RETURN

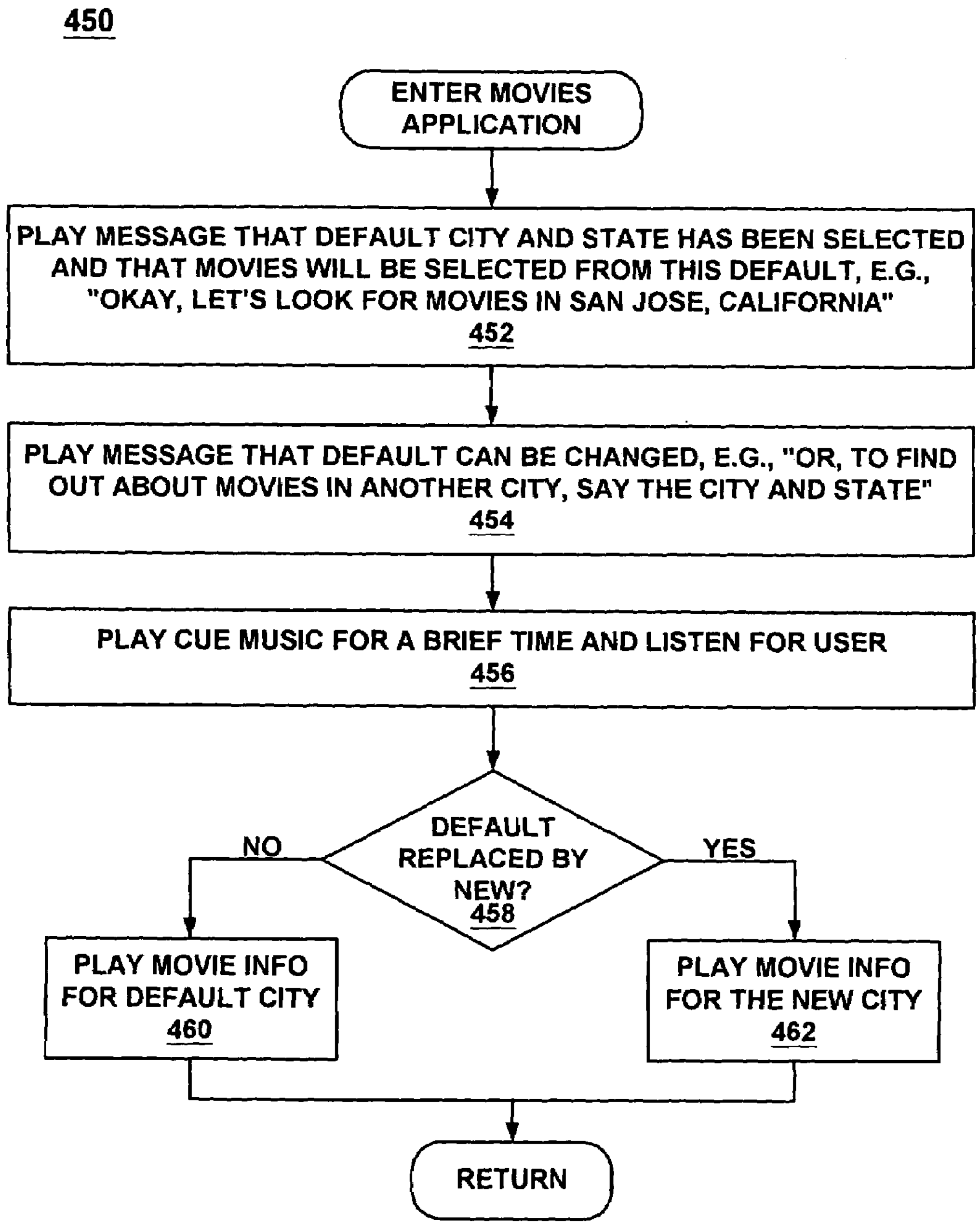

PROVIDING SERVICES FOR AN INFORMATION PROCESSING SYSTEM USING AN AUDIO INTERFACE

RELATED US APPLICATIONS

The present application is a divisional application of, and claims priority from, U.S. patent application Ser. No. 09/638,263 entitled "PROVIDING MENU AND OTIIER SERVICES FOR AN INFORMATION PROCESSING SYSTEM USING A TELEPHONE OR OTHER AUDIO INTERFACE," filed on Aug. 11, 2000 now U.S. Pat. No. 7,143,039, which claims benefit under 35 U.S.C. §§ 119 to U.S. Provisional Patent Application No. 60/220,457, filed on Jul. 24, 2000. The present patent application incorporates by reference the following co-pending United States patent applications: patent application Ser. No. 09/431,002, filed Nov. 1, 1999, entitled "Streaming Content Over a Telephone Interface," by McCue et al.; patent application Ser. No. 09/426,102, filed Oct. 22, 1999, entitled "Method and Apparatus for Content Personalization over a Telephone Interface, ", by Partovi, et al.; and patent application Ser. No. 09/466, 236, filed Dec. 17, 1999, entitled "Method and Apparatus for Electronic Commerce Using a Telephone Interface," by Partovi et al., all of which are assigned to the assignee of the present application.

BACKGROUND OF THE INVENTION

1. Field of the Invention

The present invention relates to the field of data processing systems having an audio user interface and is applicable to electronic commerce. More specifically, the present invention relates to various improvements, features, mechanisms, services and methods for improving the audio user interface aspects of a voice interface (e.g., telephone-based) data processing system as well as improvements directed to automatic data gathering.

2. Related Art

As computer systems and telephone networks modernize, it has become commercially feasible to provide information to users or subscribers over audio user interfaces, e.g., telephone and other audio networks and systems. These services allow users, e.g., "callers," to interface with a computer system for receiving and entering information. A number of these types of services utilize computer implemented automatic voice recognition tools to allow a computer system to understand and react to callers' spoken commands and information. This has proven to be an effective mechanism for providing information because telephone systems are ubiquitous, familiar to most people and relatively easy to use, understand and operate. When connected, the caller listens to information and prompts provided by the service and can speak to the service giving it commands and other information, thus forming an audio user interface.

Audio user interface systems (services) typically contain a number of special words, or command words, herein called "keywords," that a user can say and then expect a particular predetermined result from the service. In order to provide novice users with information regarding the possible keywords, audio menu structures have been proposed and implemented. However, keyword menu structures for audio user interfaces, contrasted with graphical user interfaces, have a number of special and unique issues that need to be resolved in order to provide a pleasant and effective user experience. One audio menu structure organizes the keywords in a hierarchical structure with root keywords and leaf (child) keywords. However, this approach is problematic for audio user interfaces because hierarchical structures are very difficult and troublesome to navigate through in an audio user interface framework. This is the case because it is very difficult for a user to know where in the menu structure he/she is at any time. These problems become worse as the hierarchical level deepens. Also, because the user's memory is required when selecting between two or more choices, audio user interfaces do not have an effective mechanism for giving the user a big picture view of the entire menu structure, like a graphical user interface can. Therefore, it would be advantageous to provide a menu structure that avoids the above problems and limitations.

Another approach uses a listing of keywords in the menu structure and presents the entire listing to each user so they can recognize and select the keyword that the user desires. However, this approach is also problematic because experienced users do not require a recitation of all keywords because they become familiar with them as they use the service. Forcing experienced users to hear a keyword listing in this fashion can lead to bothersome, frustrating and tedious user experiences. It would be advantageous to provide a menu structure that avoids or reduces the above problems and limitations.

Moreover, when using audio user interfaces (e.g., speech), many users do not know or are not aware of when it is their time to speak and can get confused and frustrated when they talk during times when the service is not ready to process their speech. Of course, during these periods, their speech is ignored thereby damaging their experience. Alternatively, novice users may never speak because they do not know when they should. It would be advantageous to provide a service offering a speech recognition mechanism that avoids or reduces the above problems and limitations.

Additionally, computer controlled data processing systems having audio user interfaces can automatically generate synthetic speech. By generating synthetic speech, an existing text document (or sentence or phrase) can automatically be converted to an audio signal and rendered to a user over an audio interface, e.g., a telephone system, without requiring human or operator intervention. In some cases, synthetic speech is generated by concatenating existing speech segments to produce phrases and sentences. This is called speech concatenation. A major drawback to using speech concatenation is that it sounds choppy due to the acoustical nature of the segment junctions. This type of speech often lacks many of the characteristics of human speech thereby not sounding natural or pleasing. It would be advantageous to provide a method of producing synthetic speech using speech concatenation that avoids or reduces the above problems and limitations.

Furthermore, callers often request certain content to be played over the audio user interface. For instance, news stories, financial information, or sports stories can be played over a telephone interface to the user. While this content is being delivered, users often speak to other people, e.g., to comment about the content, or just generally say words into the telephone that are not intended for the service. However, the service processes these audible signals as if they are possible keywords or commands intended by the user. This causes falsely triggered interruptions of the content delivery. Once the content is interrupted, the user must navigate through the menu structure to restart the content. Once restarted, the user also must listen to some information that he/she has already heard once. It would be advantageous to provide a content delivery mechanism within a data processing system using an audio user interface that avoids or reduces the above problems and limitations.

Additionally, in using audio user interfaces, there are many environments and conditions that lead to or create poor voice recognition. For instance, noisy telephone or cell phone lines and conditions can cause the service to not understand the user's commands. Poor voice recognition directly degrades and/or limits the user experience. Therefore, it is important that a service recognize when bad or poor voice recognition environments and conditions are present. It is not adequate to merely interrupt the user during these conditions. However, the manner in which a service deals with these conditions is important for maintaining a pleasant user experience.

Also, many data processing systems having audio user interfaces can also provide many commercial applications to and for the caller, such as, the sales of goods and services, advertising and promotions, financial information, etc. It would be helpful, in these respects, to have the caller's proper name and address during the call. Modern speech recognition systems are not able to obtain a user name and address with 100 percent reliability as needed to conduct transactions. It is desirable to provide a service that could obtain the callers' addresses automatically and economically.

SUMMARY OF THE INVENTION

Accordingly, what is needed is a data processing system having an audio user interface that provides an effective and efficient keyword menu structure that is effective for both novice and experienced users. What is needed is a data processing system having an audio user interface that produces natural and human sounding speech that is generated via speech concatenation processes. What is also needed is a data processing system having an audio user interface that limits or eliminates the occurrences of falsely triggered barge-in interruptions during periods of audio content delivery. What is further needed is a data processing system having an audio user interface that is able to personalize information offered to a user based on previous user selections thereby providing a more helpful, personalized and customized user experience. What is also needed is a data processing system having an audio user interface that effectively recognizes the conditions and environments that lead to poor voice recognition and that further provides an effective an efficient mechanism for dealing with these conditions. What is also needed is a data processing system having an audio user interface that automatically, economically and reliably recovers the name and address of a caller. These and other advantages of the present invention not specifically recited above will become clear within discussions of the present invention presented herein.

A method and system are described herein for providing efficient menu services for an information processing system that uses a telephone or other form of audio interface. In one embodiment, the menu services provide effective support for novice users by providing a full listing of available keywords and rotating advertisements which inform novice users of potential features and information they may not know. For experienced users, cue messages are rendered so that at any time the experienced user can say a desired keyword to directly invoke the corresponding application without being required to listen to an entire keyword listing. The menu is also flat to facilitate its usage and navigation there through. Full keyword listings are rendered after the user is given a brief cue to say a keyword. Service messages rotate words and word prosody to maintain freshness in the audio user interface and provide a more human sounding environment. When listening to receive information from the user, after the user has been cued, soft lightly played background music ("cue music") or other audible signals can be rendered to inform the user that a response is expected and can now be spoken to the service.

Other embodiments of the present invention determine default cities, on which to report information of a first category, where the default is based on cities that were previously selected by the caller. In one implementation, caller identification (e.g., Automatic Number Identification) provides the city and state of the caller and this city and state information is used as the default city for a first application, e.g., a service that provides information based on a specific category. The caller is given the opportunity to change this default city by actively speaking a new city. However, after a cue period has passed without a newly stated city, the default city is used thereby facilitating the use of the service. Either automatically or by user command, if a second application is entered, the selected city from the first application is automatically used as the default city for the second application. Information of a second category can then be rendered on the same city that was previously selected by the user thereby facilitating the use of the service. In automatic mode, the second application is automatically entered after the first application is finished. In this mode, the first and second applications are related, e.g., they offer one or more related services or information on related categories. For instance, the first application may provide restaurant information and the second application may provide movie information.

Other embodiments of the present invention generate synthetic speech by using speech concatenation processes that have co-articulation and real-time subject-matter-based word selection which generate human sounding speech. This embodiment provides a first group of speech segments that are recorded such that the target word of the recording is followed by a predetermined word, e.g., "the." The predetermined word is then removed from the recordings. In the automatically generated sentence or phrase, the first group is automatically placed before a second group of words that all start with the predetermined word. In this fashion, the co-articulation between the first and second groups of words is matched thereby providing a more natural and human sounding voice. This technique can be applied to many different types of speech categories, such as, sports reporting, stock reporting, news reporting, weather reporting, phone number records, address records, television guide reports, etc. To make the speech sound more human and real-time, particular words selected in either group can be determined based on the subject matter of other words in the resultant concatenative phrase and/or can be based on certain real-time events. For instance, if the phrase related to sports scores, the verb selected is based on the difference between the scores and can vary whether or not the game is over or is in-play. In another embodiment, certain event summary and series summary information is provided. This technique can be applied to many different types of speech categories, such as, sports reporting, stock reporting, news reporting, weather reporting, phone number records, address records, television guide reports, etc.

Other embodiments of the present invention reduce the occurrences of falsely triggered barge-in interruptions during periods of content delivery by only allowing interruption for certain special words. Generally, users can interrupt the service at any time to give a command, however, while content is being delivered, the delivery is only open to interruption if special words/commands are given. Otherwise, the user's speech or audible signals are ignored in that they do not interrupt the content delivery. During this special mode, a soft background signal, e.g., music, can be played to inform the user of the special mode. Before the mode is entered, the user can be informed of the special commands by a cue message, e.g., "To interrupt this story, stay stop."

Other embodiments of the present invention offer special services and modes for calls having voice recognition trouble. The special services are entered after predetermined criterion or conditions have been met by the call. For instance, poor voice recognition conditions are realized when a number of non-matches occur in a row, and/or a high percentage of no matches occur in one call, and/or if the background noise level is high, and/or if a recorded utterance is too long, and/or if a recorded utterance is too loud, and/or if some decoy word is detected in the utterance, and/or if the caller is using a cell phone, and/or if the voice to noise ratio is too low, etc. If poor voice recognition conditions are realized, then the action taken can vary. For instance, the user can be instructed on how to speak for increasing recognition likelihood. Also, push-to-talk modes can be used and keypad only data entry modes can be used. The barge-in threshold can be increased or the service can inform the user that pause or "hold-on" features are available if the user is only temporarily unable to use the service.

Other embodiments of the present invention provide special mechanisms for automatically and reliably recovering the address and name of a caller. For performing transactions, 100 percent reliability in obtaining the user name and address is desired. In this embodiment, caller ID (e.g., ANI) can be used to obtain the caller's phone number, or the phone number can be obtained by the user speaking it or by the user entering the phone number using the keypad. A reverse look-up through an electronic directory database may be used to then give the caller's address. The address may or may not be available. The caller is then asked to give his/her zip code, either by speaking it or by entering it by the keypad. If an address was obtained by reverse lookup, then the zip code is used to verify the address. If the address is verified by zip code, then the caller's name is then obtained by voice recognition or by operator (direct or indirect).

If no address was obtained by the reverse look-up, or the address was not verified by the zip code, then the caller is asked for his/her street name which is obtained by voice recognition or by operator involvement (direct or indirect). The caller is then asked for his/her street number and this is obtained by voice or by keypad. Then the caller's name is then obtained by voice recognition or by operator (direct or indirect). At any stage of the process, if voice recognition is not available or does not obtain the address, operator involvement can be used whether or not the operator actually interfaces directly with the caller. In the case of obtaining the street number, voice recognition is tried first before operator involvement is used. In the case of the user name, the operator may be used first in some instances and the first and last name can be cued separately.

BRIEF DESCRIPTION OF THE DRAWINGS

FIG. 3A illustrates a look-up table of multiple words of the same meaning or category used in one embodiment of the present invention for rotating words within a message or cue to provide speech with a more human sounding character.

FIG. 3B illustrates a look-up table of multiple recordings of the same word or phrase but having different prosody used in one embodiment of the present invention for rotating recordings within a message or cue to provide speech with a more human sounding character.

FIG. 6A and FIG. 6B are look-up tables that can be used by the process of FIG. 5 for selecting the verb recordings for use in the automatic speech generation processes of the present invention that use speech concatenation.

FIG. 8 is a look-up table that can be used by the automatic speech generation processes of an embodiment of the present invention for obtaining verb recordings and series name recordings to generate sports series summary information.

FIG. 9 is a flow diagram of steps in accordance with an embodiment of the present invention for reducing the occurrences of falsely triggered barge-in events during periods of content delivery.

FIG. 11 is a flow diagram of steps in accordance with an embodiment of the present invention for selecting a city and state for reporting information thereon.

DETAILED DESCRIPTION OF THE INVENTION

Figure 1A:
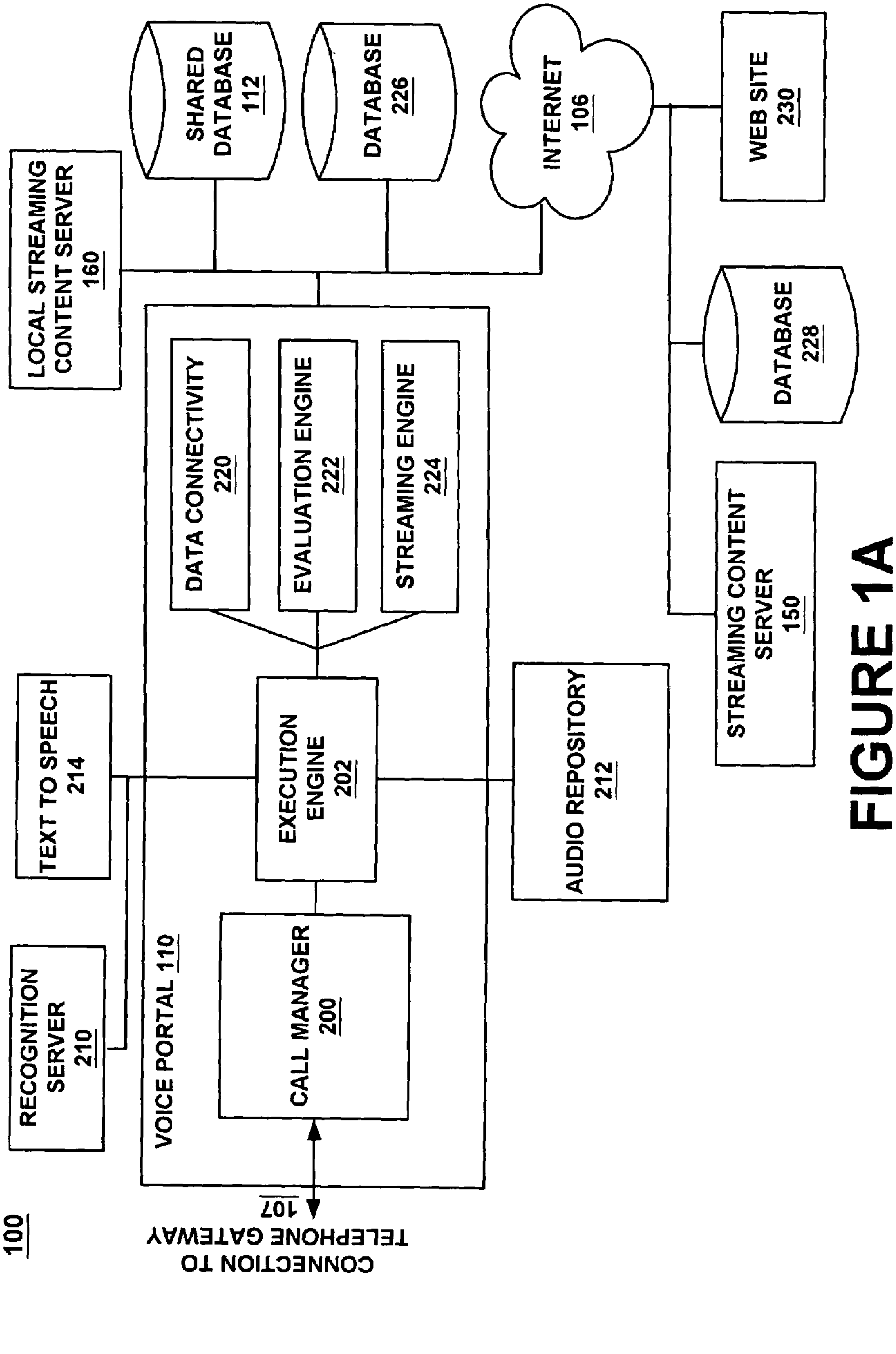
FIG. 1A illustrates an electronic system ("service") supporting a voice portal having an audio user interface, e.g., a telephone interface, capable of responding and interfacing with callers, e.g., providing streaming content delivery and/or personalized content.

In the following detailed description of the present invention, improvements, advanced features, services and mechanisms for a data processing system having an audio user interface, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory, e.g., process 250, process 268, process 360, process 400, process 450, process 470, process 500, process 512, process 516 and process 600. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "rendering" or "playing" or "calculating" or "determining" or "scrolling" or "displaying" or "recognizing" or "pausing" or "waiting" or "listening" or "synthesizing" or the like, refer to the action and processes of a computer system, or similar electronic computing device or service, that manipulates and transforms data represented as physical (electronic) quantities within the computer system's registers and memories into other data similarly represented as physical quantities within the computer system memories or registers or other such information storage, transmission or display devices.

I. Voice Portal System

"Service"

FIG. 1A illustrates the components of a voice portal system 100 (service) supporting streaming and personalized content. System 100 can be used to support the embodiments of the present invention described herein.

The following description lists the elements of FIG. 1A and describes their interconnections.

The voice portal 110 is coupled in communication with the telephone gateway 107. The voice portal 110 includes a call manager 200, an execution engine 202, a data connectivity engine 220, an evaluation engine 222 and a streaming engine 224. Additionally FIG. 1A includes elements that may be included in the voice portal 110, or which may be separate from, but coupled to, the voice portal 110. Thus, FIG. 1A also includes a recognition server 210, a text to speech server 214, an audio repository 212, the local streaming content server 160, the shared database 112, a database 226, the Internet 106, a database 228 and a web site 230. The call manager 200 within the voice portal 110 is coupled to the execution engine 202. The execution engine 202 is coupled to the recognition server 210, the text to speech server 214, the audio repository 212, data connectivity engine 220, the evaluation engine 222 and the streaming engine 224. The voice portal 110 is coupled in communication with the shared database 112, the database 226 and the Internet 106. The Internet 106 is coupled in communication with the streaming content server 150 and the database 228 and the web site 230.

The following describes each of the elements of FIG. 1A in greater detail. The use of each of the elements will be described further in conjunction with the sections describing the personalization features and the streaming content features. Typically, the voice portal 110 is implemented using one or more computers. The computers may be server computers such as UNIX workstations, personal computers and/or some other type of computers. Each of the components of the voice portal 110 may be implemented on a single computer, multiple computers and/or in a distributed fashion. Thus, each of the components of the voice portal 110 is a functional unit that may be divided over multiple computers and/or multiple processors. The voice portal 110 represents an example of a telephone interface subsystem. Different components may be included in a telephone interface subsystem. For example, a telephone interface subsystem may include one or more of the following components: the call manager 200, the execution engine, the data connectivity 220, the evaluation engine 222, the streaming engine 224, the audio repository 212, the text to speech 214 and/or the recognition engine 210.

The call manager 200 is responsible for scheduling call and process flow among the various components of the voice portal 110. The call manager 200 sequences access to the execution engine 202. Similarly, the execution engine 202 handles access to the recognition server 210, the text to speech server 214, the audio repository 212, the data connectivity engine 220, the evaluation engine 222 and the streaming engine 224.

The recognition server 210 supports voice, or speech, recognition. The recognition server 210 may use Nuance 6™ recognition software from Nuance Communications, Menlo Park, Calif., and/or some other speech recognition product. The execution engine 202 provides necessary grammars to the recognition server 210 to assist in the recognition process. The results from the recognition server 210 can then be used by the execution engine 202 to further direct the call session. Additionally, the recognition server 110 may support voice login using products such as Nuance Verifier™ and/or other voice login and verification products.

The text to speech server 214 supports the conversion of text to synthesized speech for transmission over the telephone gateway 107. For example, the execution engine 202 could request that the phrase, "The temperature in Palo Alto, Calif., is currently 58 degrees and rising" be spoken to a caller.

That phrase stored as digitized text would be translated to speech (digitized audio) by the text to speech server 214 for playback over the telephone network on the telephone (e.g. the telephone 100). Additionally the text to speech server 214 may respond using a selected dialect and/or other voice character settings appropriate for the caller.

The audio repository 212 may include recorded sounds and/or voices. In some embodiments the audio repository 212 is coupled to one of the databases (e.g. the database 226, the database 228 and/or the shared database 112) for storage of audio files. Typically, the audio repository server 212 responds to requests from the execution engine 202 to play a specific sound or recording.

For example, the audio repository 212 may contain a standard voice greeting for callers to the voice portal 110, in which case the execution engine 202 could request playback of that particular sound file. The selected sound file would then be delivered by the audio repository 212 through the call manager 200 and across the telephone gateway 107 to the caller on the telephone, e.g. the telephone 100. Additionally, the telephone gateway 107 may include digital signal processors (DSPs) that support the generation of sounds and/or audio mixing. Some embodiments of the invention include telephony systems from Dialogic, an Intel Corporation.

The execution engine 202 supports the execution of multiple threads with each thread operating one or more applications for a particular call to the voice portal 110. Thus, for example, if the user has called in to the voice portal 110, a thread may be started to provide her/him a voice interface to the system and for accessing other options.

In some embodiments of the invention an extensible markup language (XML)-style language is used to program applications. Each application is then written in the XML-style language and executed in a thread on the execution engine 202. In some embodiments, an XML-style language such as VoiceXML from the VoiceXML Forum, <http://www.voicexml.org/>, is extended for use by the execution engine 202 in the voice portal 110.

Additionally, the execution engine 202 may access the data connectivity engine 220 for access to databases and web sites (e.g. the shared database 112, the web site 230), the evaluation engine 222 for computing tasks and the streaming engine 224 for presentation of streaming media and audio. In one embodiment, the execution engine 220 can be a general purpose computer system and may includes an address/data bus for communicating information, one or more central processor(s) coupled with bus for processing information and instructions, a computer readable volatile memory unit (e.g., random access memory, static RAM, dynamic RAM, etc.) coupled with the bus for storing information and instructions for the central processor(s) and a computer readable non-volatile memory unit (e.g., read only memory, programmable ROM, flash memory, EPROM, EEPROM, etc.) coupled with the bus for storing static information and instructions for processor(s).

The execution engine 202 can optionally include a mass storage computer readable data storage device, such as a magnetic or optical disk and disk drive coupled with the bus for storing information and instructions. Optionally, execution engine 202 can also include a display device coupled to the bus for displaying information to the computer user, an alphanumeric input device including alphanumeric and function keys coupled to the bus for communicating information and command selections to central processor(s), a cursor control device coupled to the bus for communicating user input information and command selections to the central processor(s), and a signal input/output device coupled to the bus for communicating messages, command selections, data, etc., to and from processor(s).

The streaming engine 224 of FIG. 1A may allow users of the voice portal 10 to access streaming audio content, or the audio portion of streaming video content, over the telephone interface. For example, a streaming media broadcast from ZDNet™ could be accessed by the streaming engine 224 for playback through the voice portal. The streaming engine 224 can act as a streaming content client to a streaming content server, e.g., the streaming engine 224 can act like a RealPlayer software client to receive streaming content broadcasts from a Real Networks server. Additionally, the streaming engine 224 can participate in a streaming content broadcast by acting like a streaming broadcast forwarding server. This second function is particularly useful where multiple users are listening to the same broadcast at the same time (e.g., multiple users may call into the voice portal 10 to listen to the same live streaming broadcast of a company's conference call with the analysts).

The data connectivity engine 220 supports access to a variety of databases including databases accessed across the Internet 106, e.g. the database 228, and also access to web sites over the Internet such as the web site 230. In some embodiments the data connectivity engine can access standard query language (SQL) databases, open database connectivity databases (ODBC), and/or other types of databases. The shared database 112 is represented separately from the other databases in FIG. 2; however, the shared database 112 may in fact be part of one of the other databases, e.g. the database 226. Thus, the shared database 112 is distinguished from other databases accessed by the voice portal 110 in that it contains user profile information.

Having described the hardware and software architecture supporting various embodiments of the invention, the various features provided by different embodiments of the present invention now follow.

II. Keyword Menu Structure

Figure 1B:
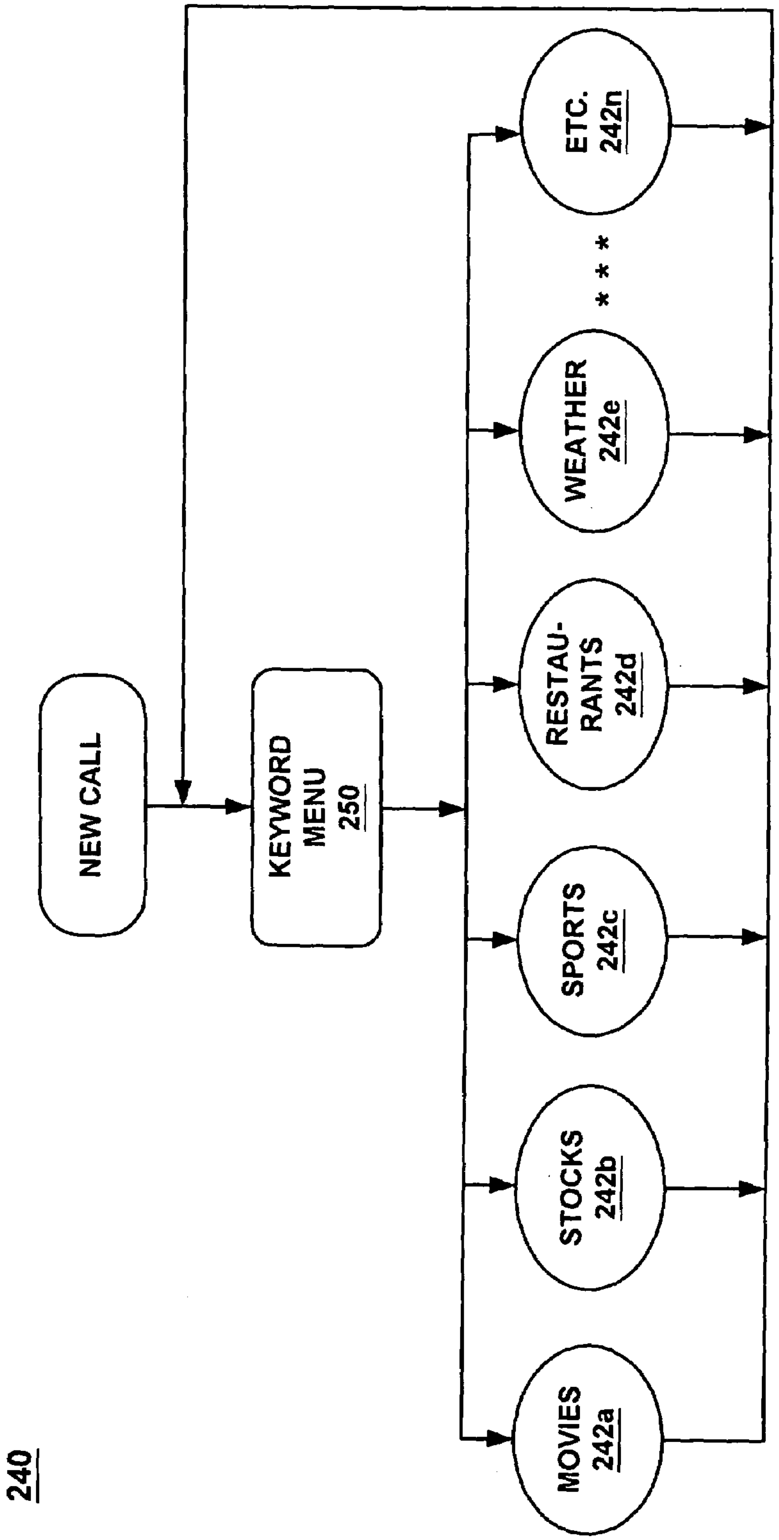
FIG. 1B illustrates the flat nature of the menu structure implemented in the audio user interface in accordance with an embodiment of the present invention.

FIG. 1B illustrates a keyword menu structure 240 of the audio user interface in accordance with an embodiment of the present invention. As shown in FIG. 1B, the menu structure 240 is relatively flat in that a multi-level hierarchical menu structure is not employed. The structure 240 is kept flat in order to facilitate user navigation there through. From the keyword menu or cue process 250, a number of applications or services 242*a*-242*n* can be entered by the user saying a keyword associated with the application, e.g., "movies" causes application 242*a* to be executed. In the preferred embodiment, there are about a dozen different applications that can be selected within the service 100. The particular applications listed in FIG. 1B are exemplary only and different services can be added and others can be eliminated within the scope of the present invention. For instance, the movies application 242*a* gives the user information regarding motion pictures and where they are playing within a selected city. The stocks application 242*b* gives the user stock quotes based on user selected companies. Any of the applications can be directly entered from the menu cue 250 and each application has its own keyword as shown in FIG. 1B. At the completion of an application, the menu cue 250 is entered again. By maintaining a relatively flat menu structure 240, the user can readily navigate through the possible options with little or no required knowledge of where he/she previously had been.

Figure 2A:
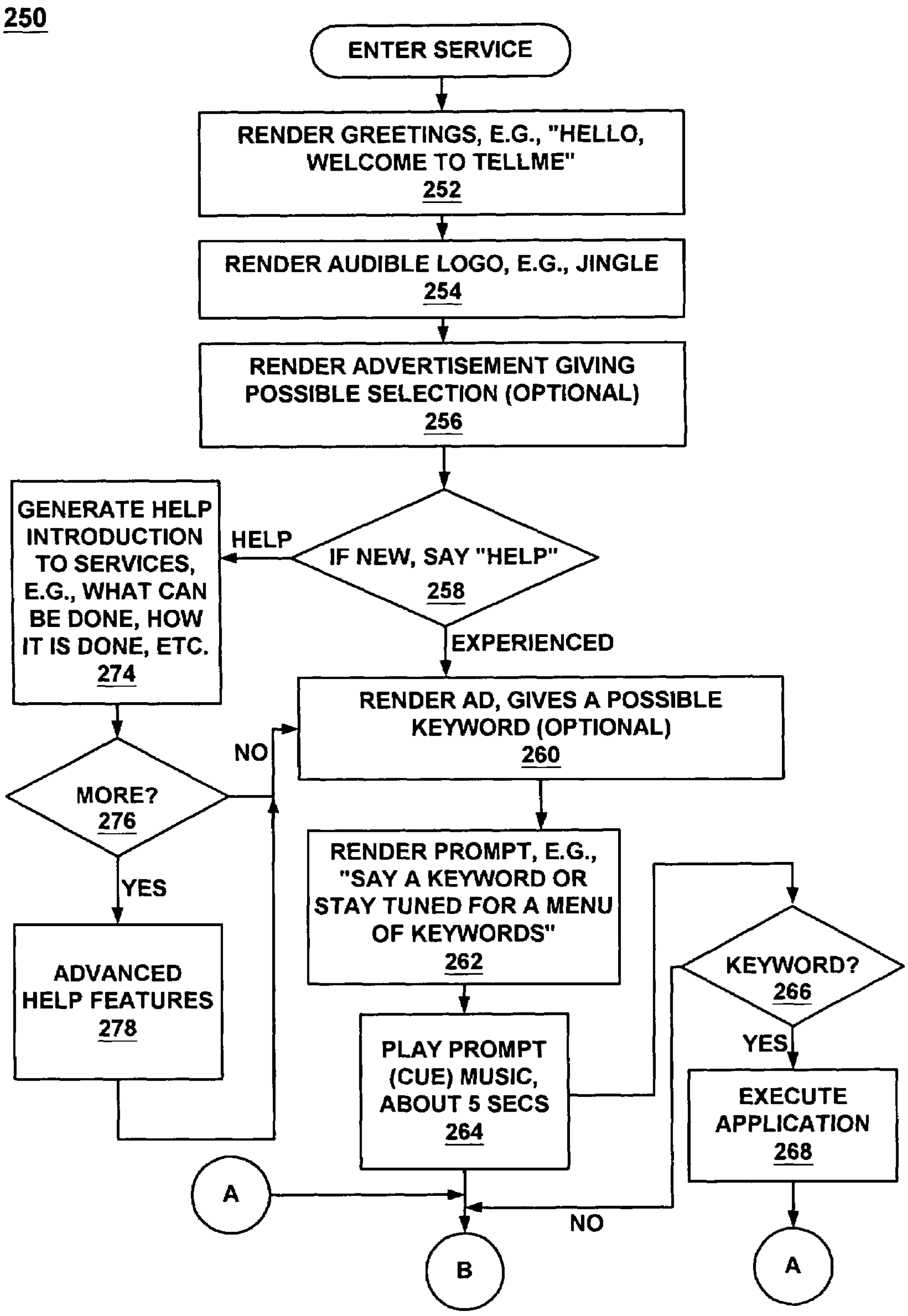
FIG. 2A, FIG. 2B and FIG. 2C illustrate steps in accordance with an embodiment of the present invention for implementing efficient and effective menu services for entering and exiting user-selected applications of an audio user interface.
Figure 2B:
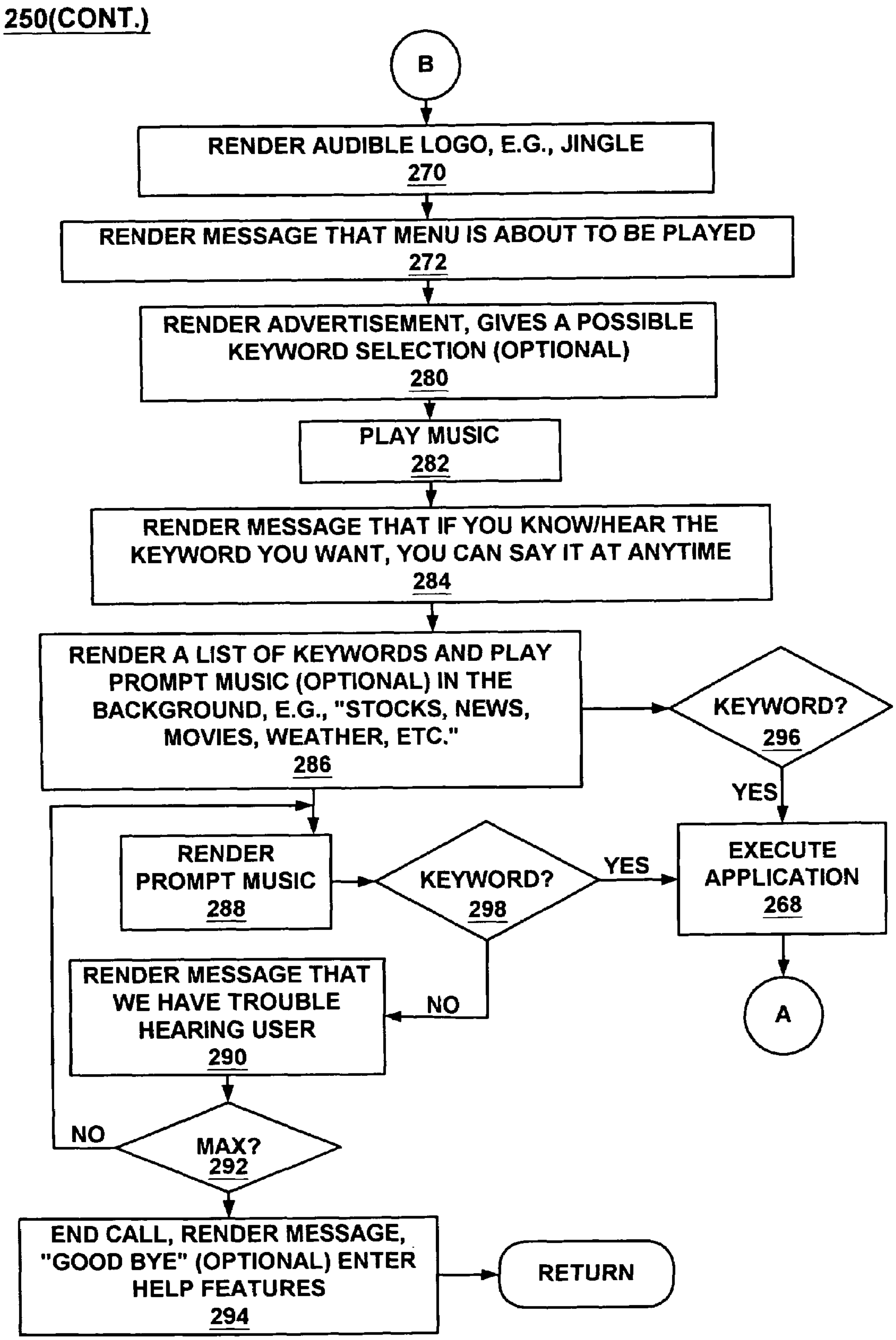

FIG. 2A and FIG. 2B illustrate the steps involved in the menu cue process 250 in more detail. Process 250, in accordance with an embodiment of the present invention, offers an effective and efficient keyword menu service that can be effectively used by both novice and experienced users. Generally, experienced users do not want to hear the entire keyword listing on each call because this becomes burdensome and tedious. However, novice users find this helpful because they do not yet know all of the services available to them. This embodiment of the present invention provides a balance between these needs. First, the users are cued with a message that they can say a keyword at any time to invoke their application or that they can stay tuned for the entire keyword menu. This appeals to experienced users because they can immediately invoke their application. Next, if the user waits and does not select anything (e.g., because they do not know many keywords yet, etc.), then a listing of keywords starts playing that represents the entire flat menu structure. This is helpful for novice users. Further, the user can invoke the menu structure by saying the menu keyword at any time.

At FIG. 2A, the service 100 is entered upon a new user entering the audio user interface, e.g., a new call being received. In response, a greetings or welcome message is rendered at step 252. The particular welcome phrase rendered at step 252 is rotated upon each time the caller enters the service 100 in order to keep the interface fresh and more human sounding. FIG. 3A illustrates a look-up table 310 containing multiple different phrases 310(1)-310(*n*) that can be used for the welcome message rendered at step 252. Each time the caller enters the service 100, a different word from table 310 is obtained. It is appreciated that each phrase of table 310 corresponds to a different word that is of the greeting category. It is appreciated that as a part of rotation, the word selected from the look-up table 310 can be based on the time of day, e.g., in the morning the greeting could be, "Good Morning," and in the evening the greeting could be, "Good Evening," etc. Although the words used may be different, the entries of table 310 are all greetings.

Alternatively, at step 252, rotation can be accomplished by using the same word, but having different pronunciations, e.g., each phrase having different prosody but saying the same word. Prosody represents the acoustic properties of the speech and represents characteristics that are aside from its subject matter. Prosody represents the emphasis, energy, rhythm, pitch, pause, speed, emphasis, intonation (pitch), etc., of the speech. FIG. 3B illustrates a look-up table 312 containing multiple different phrases or recordings 312(1)-312(*n*) for a welcome message containing the same words, "Welcome to Tellme." Each phrase or recording of 312(1)-312(*n*) contains the same words, but has different prosody. The particular welcome phrase rendered at step 252 is rotated upon each time the caller enters the service 100 in order to keep the interface fresh and more human sounding. It is appreciated that when a particular prompt or message is said to be "rotated" or able to be "rotated," what is meant is that the words of the message can be changed or the prosody of the words in the message can be changed in accordance with the techniques described above.

Content can also be rotated based on the user and the particular times he/she heard the same advertisement. For instance, if a user as heard a house advertisement for "stocks," over a number of times, n, without selecting that option, then that advertisement material can be rotated out for a predetermined period of time. Alternatively, the house advertisement for "stocks" can be rotated out if the user selects stocks on a routine basis. Or, if a user has not yet selected a particular item, it can be selected to be rotated in. The nature of the user can be defined by his/her past history during a given call, or it can be obtained from recorded information about the user's past activities that are stored in a user profile and accessed via the user's caller ID (e.g., ANI).

At step 254 of FIG. 2A, an audible logo or jingle is rendered to indicate that the user is at the menu stage. It is appreciated that steps 254 and 252 may overlap in time. At step 256, an advertisement, e.g., third party or service or house advertisement, can optionally be rendered to the user. Similar to step 252, some or all of the words in the advertisement can be rotated. A house or service advertisement may provide a suggestion of a possible application that the user can invoke and also it indicates that the user can invoke the application by saying its keyword at any time. For instance, at step 256, the house advertisement would be, "If you want information about the stock market, just say stocks." House or service advertisements are helpful for novice users who are not entirely familiar with the possible applications supported within the service 100, or for expert users they can notify them when a new application is added to the service 100. In one embodiment, the particular keywords selected for the house advertisement are those that the user has not yet tried. At step 256, the advertisement could also be a third party advertisement or any type of advertisement message.

At step 258, the service 100 renders a message to the user that if they are new, they can say "help" and special services will be provided. If the user responds with a "help" command, then step 274 is entered where an introduction is rendered to the user regarding the basics on how to interact with the audio user interface 240. Namely, the types of services available to the user are presented at step 274. A cue message is then given asking if the user desires more help. At step 276, if the user desires more help, they can indicate with an audio command and step 278 is entered where more help is provided. Otherwise, step 260 is entered. At step 258, if the user does not say "help," then step 260 is entered. It is appreciated that the service 100 can also detect whether or not the user is experienced by checking the caller ID (e.g., ANI). In this embodiment, if the caller ID (e.g., ANI) indicates an experienced user, then step 258 can be bypassed all together.

At step 260 of FIG. 2A, a short advertisement is optionally played. This advertisement can be rotated. This step is analogous to the optional house advertisement of step 256 and a possible application or service is suggested to the user. For instance, at step 260, the service 100 could play, "If you are looking for a movie, say movies." At step 262, the service 100 renders a menu cue or "cue message" which is a message indicating that a keyword can be said at any time or, alternatively, the user can wait silently and the entire menu of keywords will be played. For instance, at step 262 the service 100 can render, "Say any keyword now or stay tuned for a menu of keywords." This feature is very useful because novice users can remain on the call and obtain the full keyword menu while experienced users on the other hand can immediately say the keyword they want thereby avoiding the full keyword menu.

At step 264, the service 100 plays an audible signal or "cue music" for a few seconds thereby indicating to the caller that he/she may speak at this time to select a keyword or otherwise give a command. At this point, dead air is not allowed. During the cue music, the service 100 is listening to the user and will perform automatic voice recognition on any user utterance. In one embodiment of the present invention, the audible signal is light (e.g., softly played low volume) background music. This audible cue becomes familiar to the caller after a number of calls and informs the caller that a command or keyword can be given during the cue music. It is appreciated that the user can say keywords at other times before or after the cue music, however, the cue music of step 264 is helpful for novice users by given them a definite cue. By playing an audible signal, rather than remaining silent (dead air), the service 100 also reinforces to the user that it is still active and listening to the user. If, during the cue period, the user says a keyword (represented by step 266) that is recognized by the service 100, then step 268 is entered. At step 268, the application related to the keyword is invoked by the service 100. It is appreciated that after the application is completed, step 270 can be entered.

At step 264, if the user does not say a keyword during the cue music, then the keyword menu structure is played by default. This is described as follows. At step 270, an optional audible logo signal, e.g., musical jingle, is played to inform the user that the menu is about to be played. At step 272, a message is rendered saying that the user is at the menu, e.g., "Tellme Menu," is played. Step 280 of FIG. 2B is then entered. At step 280, a house advertisement (that can be rotated) is played to the user having the same characteristics as the house advertisement of step 256 and step 260. It is appreciated that the house advertisement can focus on keywords that the user has not yet tried. The advertisement can also be for a company or product not related to the service 100. At step 282, some music is played for a brief period of time to give the user a chance to understand, e.g., digest, the information just presented to him/her. The music also can be rotated and keeps the interface fresh and interesting and pleasant sounding.

Importantly, at step 284, a message is rendered telling the user that if they know or hear the keyword they want, they can say it at any time. This is helpful so that users know that they are not required to listen to all of the keywords before they make their selection. At step 286, the service 100 begins to play a listing of all of the supported keywords in order. Optionally, keywords can be played in groups (e.g., 3 or 4 keywords per group) with cue music being played in between the groups. Or, a listing of each keyword can be rendered so that the user can hear each keyword individually. Alternatively, the listing can be played with the cue music playing in the background all the time. If, during the period that the keywords are being rendered, the user says a keyword (represented by step 296) that is recognized by the service 100, then step 268 is entered. At step 268, the application related to the keyword is invoked by the service 100. It is appreciated that after the application is completed, step 270 can be entered.

If no keyword is given, cue music is played step 288. Troubleshooting steps can next be performed. At step 290, the service 100 indicates that they are having trouble hearing the user and after a predetermined number of attempts (step 292) cycled back to step 288, step 294 is entered. At step 294, advanced troubleshooting processes can be run or the call can be terminated.

Figure 2C:
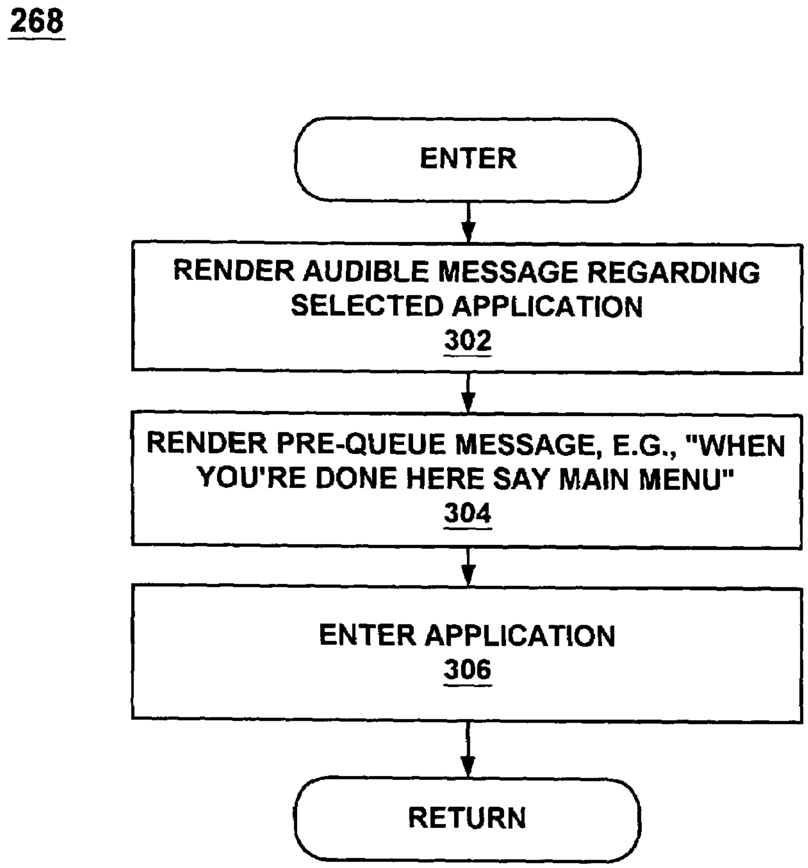

FIG. 2C illustrates exemplary steps that can be performed by the application program, e.g., step 268, in response to the user selection. At step 302, the service 100 renders an audible signal indicating that the selected application is being entered. For instance, if movies is selected, at step 302 the service 100 could play, "Tellme Movies." At step 304, a pre-cue message is given to inform the user what to do when they are finished with this application. For instance, the service 100 renders, "When you're done here, say Tellme Menu." At any time if the menu keyword is said by the user then step 270 is entered. At step 306, the application is entered and when complete, step 268 returns and normally step 270 is then entered again.

It is appreciated that the greetings messages and the messages at steps 262 and 272 and 284 and 290, and at other steps, can be rotated in order to change the words or the prosody of the words in the message. This is done, for instance, to change the way in which these steps sound to the user while maintaining the subject matter of each step. For example, welcome messages and frequently said words can be rendered with different tones, inflection, etc., to keep the messages fresh and more human sounding to the users. As discussed above, word or word prosody rotation within the messages can be based on a number of factors (some relating to the user and some unrelated to the user) including the time of day, the number of times the user has been through the menu structure, the prior selections of the user, etc.

It is further appreciated that the entire process of FIG. 2A and FIG. 2B can be interrupted at any time by a user saying a keyword or saying the menu keyword. The menu keyword places the process into step 270 and a keyword associated with an application will immediately invoke the application.

III. Synthetic Speech by Speech Concatenation

One embodiment of the present invention is directed to automatic speech synthesis procedures using speech concatenation techniques. Speech concatenation techniques involve constructing phrases and sentences from small segments of human speech. A goal of this embodiment is to generate a human sounding voice using speech concatenation techniques 1) which provide proper co-articulation between speech segments and 2) which provide word selection based on the subject matter of the sentence and also based on real-time events. In normal human speech, the end of a spoken word takes on acoustic properties of the start of the next word as the words are spoken. This characteristic is often called co-articulation and may involve the addition of phonemes between words to create a natural sounding flow between them. The result is a sort of "slurring" of the junction between words and leads to speech having human sounding properties. In conventional speech concatenation processes, the small speech segments are recorded without any knowledge or basis of how they will be used in sentences. The result is that no co-articulation is provided between segments. However, speech concatenation without co-articulation leads to very choppy, disjointed speech that does not sound very realistic.

This embodiment of the present invention provides speech concatenation processes that employ co-articulation between certain voice segments. This embodiment also provides for automatic word selection based on the subject matter of the sentence being constructed. This embodiment also provides for automatic word selection based on real-time events. The result is a very human sounding, natural and pleasing voice that is often assumed to be real (e.g., human) and does not sound synthetically generated. When applied to sports, this embodiment also provides different concatenation formats for pre-game, during play and post-game results. Also, sports series summary information can be provided after a score is given for a particular game. Although applied to sports reporting, as an example, the techniques described herein can be applied equally well to many different types of speech categories, such as, stock reporting, news reporting, weather reporting, phone number records, address records, television guide reports, etc.

Figure 4A:
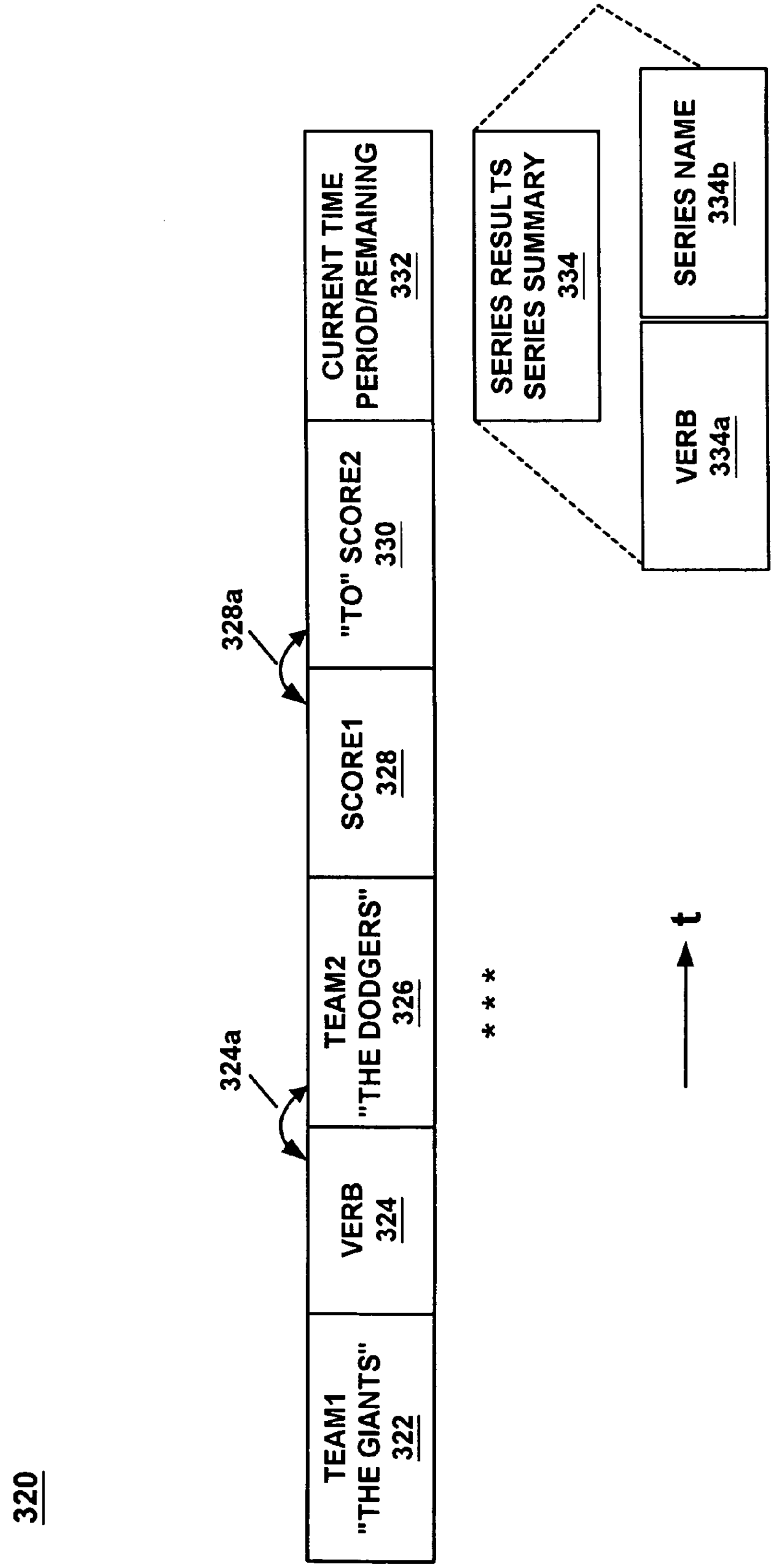
FIG. 4A is a timing diagram illustrating an exemplary embodiment of the present invention for using speech concatenation with co-articulation and real-time subject-matter-based word selection to generate more human sounding speech with a more human sounding character.

FIG. 4A illustrates an example model of this embodiment of the present invention. The example is directed to sports reporting, however, this embodiment of the present invention can be applied to any information reporting, such as stock quotes, news stories, etc., and sports reporting is merely one example to illustrate the concepts involved. Synthetic phrase 320 is made up of speech segments 322-332 and is automatically constructed using computer driven speech concatenation. Each speech segment is a pre-recorded word of human speech. The phrase 320 is a model for reporting sports information. Specifically, the model reports the score of a game between two teams and can be used during play or post-game. Generally, the phrase 320 contains two team names and the score between them for a particular game. The phrase 320 can also alternatively include information regarding the current time of play (or duration of the game) or can include series summary information. The phrase 320 is automatically generated by a computer concatenating each segment 322-332 in its order as shown in FIG. 4A and is generated to sound like a human sports announcer in accordance with this embodiment of the present invention.

To sound like a human announcer, several features are implemented. First, the verb segment 324 that is selected is based on the difference between the scores 328 and 330. As this difference increases, different verbs are selected to appropriately describe the score as a human announcer might come up with on the fly. Therefore, the verb selection at segment 324 is based on data found within the sentence 320. This feature helps to customize the sentence 320 thereby rendering it more human like and appealing to the listener. For instance, as the score difference increases, verbs are used having more energy and that illustrate or exclaim the extreme.

Second, each team name starts with the same word, e.g., "the," so that their recordings all start with the same sound. Therefore, all voice recordings used for segment 326 start with the same sound. In this example, each team name starts with "the." Using this constraint, the words that precede the team name in model 320 can be recorded with the proper co-articulation because the following word is known a priori. As such, this embodiment is able to provide the proper co-articulation for junction 324*a*. This is done by recording each of the possible verbs (for segment 324) in a recording where the target verb is followed by the word "the." Then, the recording is cut short to eliminate the "the" portion. By doing this, each verb is recorded with the proper co-articulation that matches the team name to follow, and this is true for all team names and for all verbs. As a result, the audio junction at 324*a* sounds very natural when rendered synthetically thereby rendering it more human like and appealing to the listener.

Third, in order to sound more like an announcer, the particular verb selected for segment 324 depends on the real-time nature of the game, e.g., whether or not the game is in play or already over and which part of the game is being played. This feature is improved by adding the current time or play duration at segment 332. Real-time information makes the sentence sound like the announcer is actually at the game thereby rendering it more human like and appealing to the listener.

Figure 5:
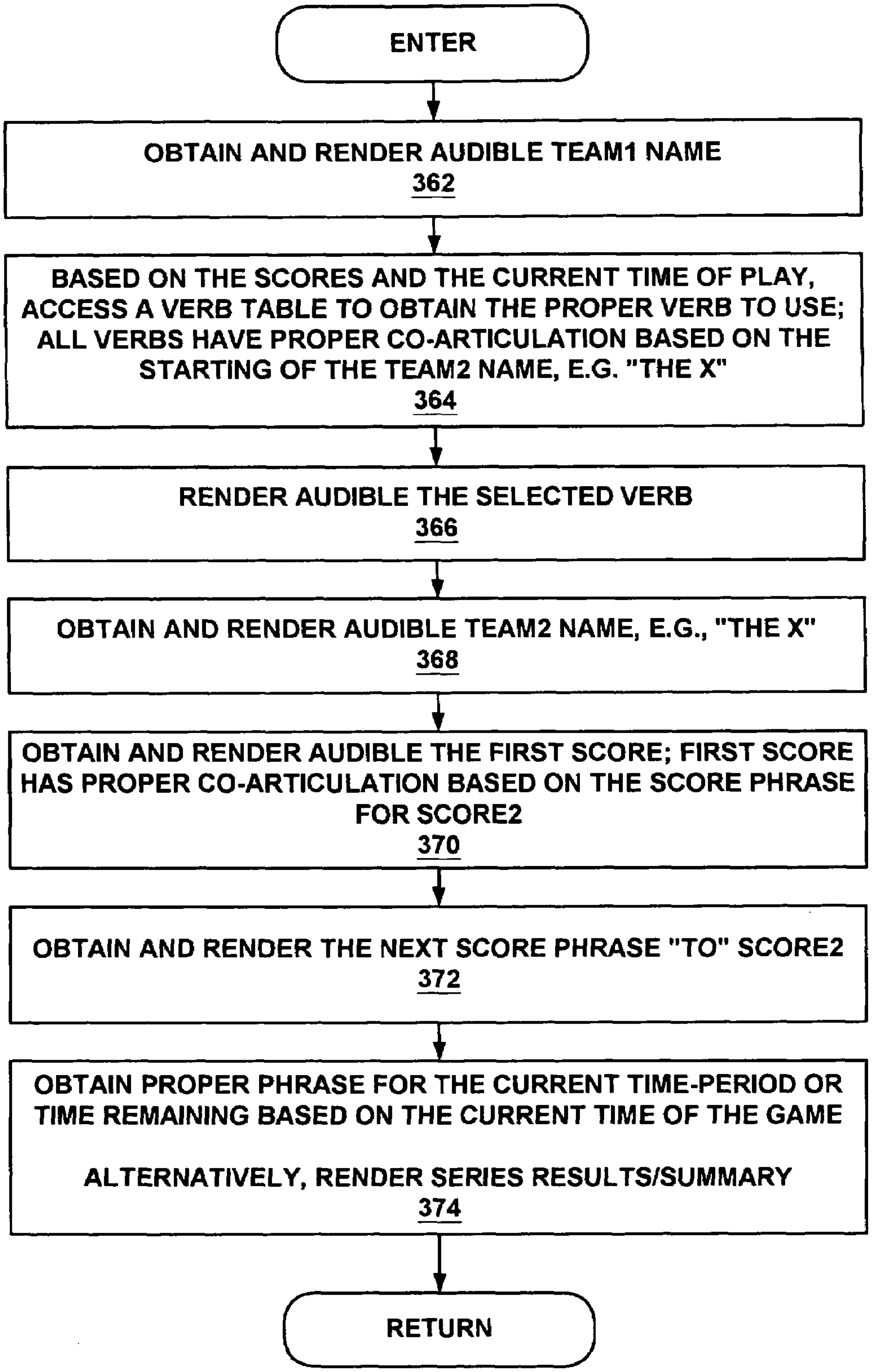
FIG. 5 is a flow diagram of steps of one embodiment of the present invention for automatically generating speech using speech concatenation with co-articulation and real-time subject-matter-based word selection to generate more human sounding speech.

FIG. 5 illustrates the computer implemented process 360 used for constructing the phrase 320 of FIG. 4A. Refer to FIG. 4A and FIG. 5. Process 360 is invoked in response to a user wanting the score of a particular sports game, although the techniques used in process 360 could be used for reporting any information of any subject matter. The game typically involves two teams. At step 362, the name of the first team 322 is selected from a name table and rendered. Conventionally, the first team is the team ahead or that won the game. The name table contains a name for each team and they all start with a predetermined word, e.g., "the."

At step 364, the verb 324 is selected. In this embodiment, the verb selection is based on the score of the game and the current time of play, e.g., whether or not the game is over or is still in-play when the user request is processed. If the game is over, then past-tense verbs are used. It is appreciated that the threshold differences for small, medium and large score differentials depend on the sport. These thresholds change depending on the particular sport involved in the user request. For instance, a difference of four may be a large difference for soccer while only a medium difference for baseball and a small difference for basketball.

FIG. 6A illustrates a verb table 380*a* used for games in play. FIG. 6B illustrates a verb table 380*b* used for games that have completed. If the game is still in play, then table 380*a* is used otherwise table 380*b* is used. If the game is still in play, then depending on the score, a different verb will be selected from table 380*a*. In FIG. 6A, the first column 382*a* relates to verbs for scores having large differences, the second column 384*a* relates to verbs for scores having average or medium differences and the last column 386*a* relates to verbs for scores having small differences. With each column, any verb can be selected and the particular verb selected can be rotated or randomly selected to maintain freshness and to maintain a human sounding experience. Any column can contain verbs of the same words but having differences only in prosody.

However, if the game is over, then depending on the score, a different verb will be selected from table 380*b*. In FIG. 6B, the first column 382*b* relates to verbs for scores having large differences, the second column 384*b* relates to verbs for scores having average or medium differences and the last column 386*b* relates to verbs for scores having small differences. With each column, any verb can be selected and the particular verb selected can be rotated or randomly selected to maintain freshness and to maintain a human sounding experience. Again, any column can contain verbs of the same words but having differences only in prosody.

It is appreciated that each verb of each table of FIG. 6A and FIG. 6B are all recorded using a recording where the verb is followed by the word "the." The extra "the" is then removed from the recordings, but the verbs nevertheless maintain the proper co-articulation. Also, as discussed above, verb recordings of the tables 380*a* and 380*b* can be of the same word but having differences in prosody only.

An example of the verb selection of step 364 follows. Assuming a request is made for a game in which the score is 9 to 1 and it is a baseball game, then the score is a large difference. Assuming the game is not yet over, then table 380*a* is selected by the service 100 and column 382*a* is selected. At step 364, the service 100 will select one of the segments from "are crushing," or "are punishing," or "are stomping," or "are squashing" for verb 324. At step 366, the selected verb is rendered.

At step 368 of FIG. 5, the name of the other team, e.g., the second team, is selected from the name table and rendered to the user. Since this team starts with "the" and since each verb was recorded in a recording where the target verb was followed by "the," the co-articulation 324*a* between the selected verb 324 and the name of the second team 326 is properly matched. At step 370, the higher score is obtained from a first numbers database and rendered for segment 328. Each score segment in the first numbers database, e.g., for score1 segment 328, is recorded in a recording where the target number is followed by the word "to" in order to provide the proper co-articulation 328*a* for segments 328 and 330. The "to" phrase is eliminated from the recordings but leaving the proper co-articulation. Therefore, at step 370, the service 100 renders the number "9" in the above example.

At step 372, the service 100 obtains the second score and selects this score from a second numbers database where each number is recorded with the word "to" in front. Step 372 is associated with segment 330. Therefore, at step 372, the service 100 renders the number "to 1" in the above example. Since the second score segment 330 starts with "to" and since each score1 was recorded in a phrase where the score was followed by "to," the co-articulation 328*a* between score1 328 and score2 330 is properly matched. It is appreciated that in shut-outs, the score segments 348 and 350 may be optional because the verb implies the score.

Figure 7:
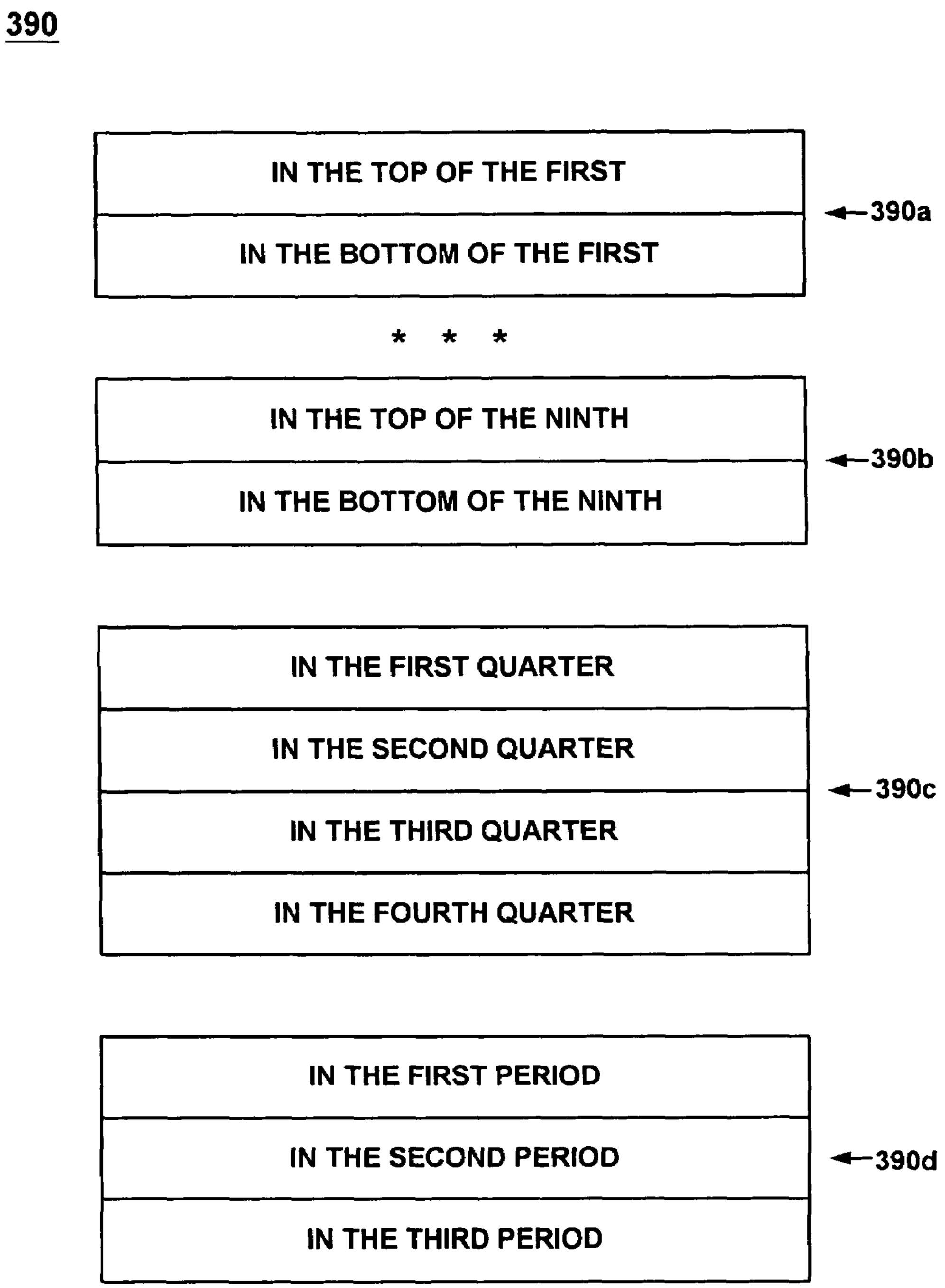
FIG. 7 is a look-up table that can be used by the process of FIG. 5 for selecting the current time period/remaining recording for use in the automatic speech generation processes of the present invention that use speech concatenation.

At step 374 of FIG. 5, the service 100 may obtain a game period or report series summary information for segment 332 or 334. These segments are optional. If the game is in play then segment 332 is typically used. At segment 332, a lookup table (FIG. 7) is used by step 374 to obtain the current period of play. This current period is then rendered to the user. FIG. 7 illustrates a few exemplary entries of the lookup table 390. The particular entry selected at step 374 depends on the type of sporting event being played and the current game duration. For instance, entries 390*a*-390*b* are used for baseball, entries 390*c* can be used for football and entries 390*d* can be used for hockey.

Alternatively, if the game is over then series information can be given at segment 334 which may include a verb 334*a* and a series name 334*b*. Possible verbs are shown in FIG. 8 in column 394 of table 395. Possible series names are shown in column 396. Again, each name of a series starts with the word "the." The verbs selected for segment 334*a* are recorded in recordings where the target verb is followed by "the" and the word "the" is then removed from the recordings leaving the proper co-articulation. In one example, if the series is the "World Series" and the game is over, then the selected segments for 334 may be "leading" (=334*a*) "the World Series" (=334*b*).

Below are two examples of possible speech generated by process 360 of FIG. 5:

"The Giants Are Stomping The Dodgers 9 to 1 in the Bottom of the Ninth."

"The Giants Punished The Dodgers 9 to 1 Leading the World Series."

"The Lakers Downed The Pacers 116 to 111 Winning the NBA Championship"

If the score is a shut-out, then the scores segments can be eliminated, for instance:

"The Yankees Shut-out the Mets in Overtime"

In addition to the segments of 320 of FIG. 4A, in an alternative embodiment, if the game has already been played and is one day old, then the service 100 can add the word "Yesterday," to the model 320. The result would look like:

"Yesterday, The Giants Punished The Dodgers 9 to 1 Leading the World Series."

Or, if the game is several days old, then the service 100 can give the day of play, such as:

"On Monday, The Giants Punished The Dodgers 9 to 1 Leading the World Series."

Figure 4B:
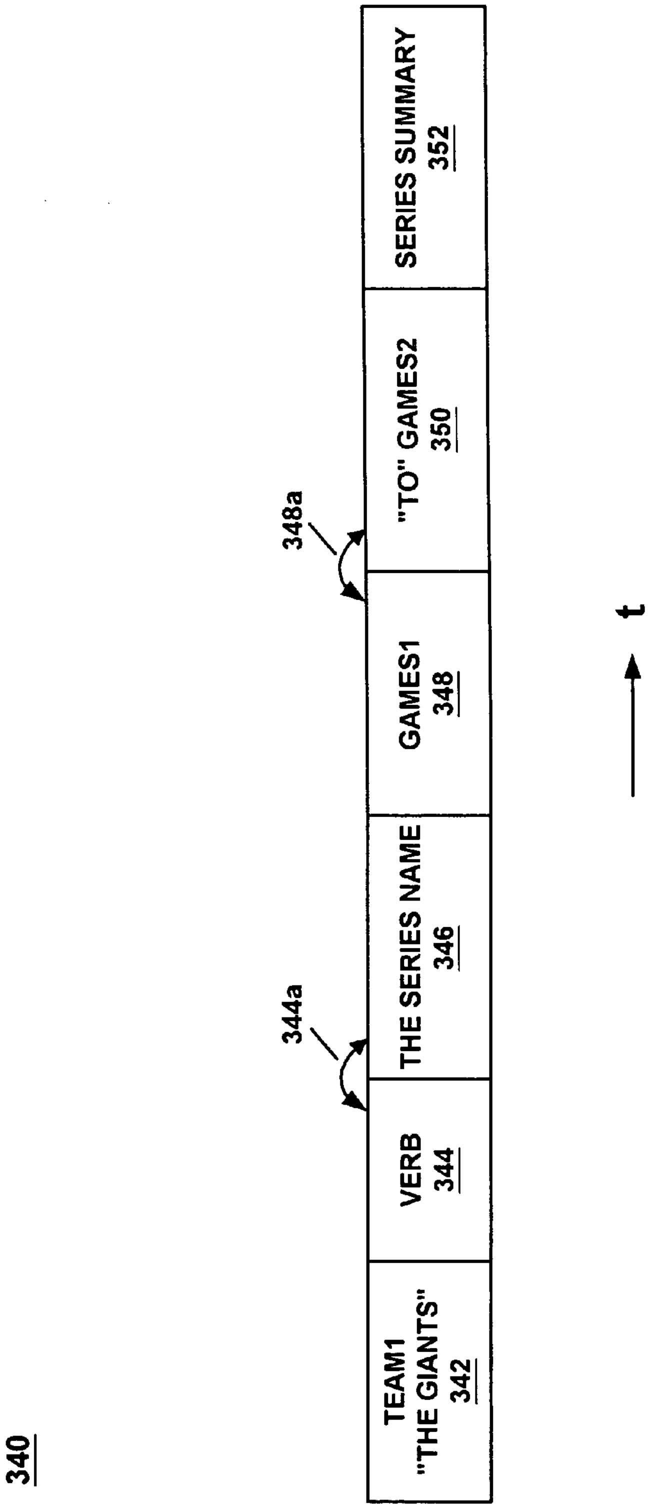
FIG. 4B is a timing diagram having the speech properties of FIG. 4A and used in an exemplary configuration for automatically generating and providing sports series summary information.

FIG. 4B illustrates another phrase model 340 that can be used. Model 340 can be used for reporting series summary information. The verb selected at segment 344 and the series name selected for segment 346 are recorded such that they provide proper co-articulation at junction 344*a* in the manner as described with respect to FIG. 4A. For instance, each possible recording for segment 344 is recorded in a phrase where the target word precedes "the." The "the" portion of the recording is then removed. Each possible value for segment 348 is followed by the word "games" which remains in the recordings. Each possible value for segment 350 is preceded by the word "to" which remains in the recordings. Series summary information can be any information related to the selected series. Co-articulation 348*a* can be matched by recording the data for segment 348 in recordings where the word "game" is followed by the word "to" and the "to" portion of the recording is eliminated. Segment 352 is optional An example of the speech generated by the model 340 is shown below:

"The Giants Lead the World Series 2 Games to 1."

"The Rangers Lead the Western Division 4 Games to 2 in the National Finals."

Figure 4C:
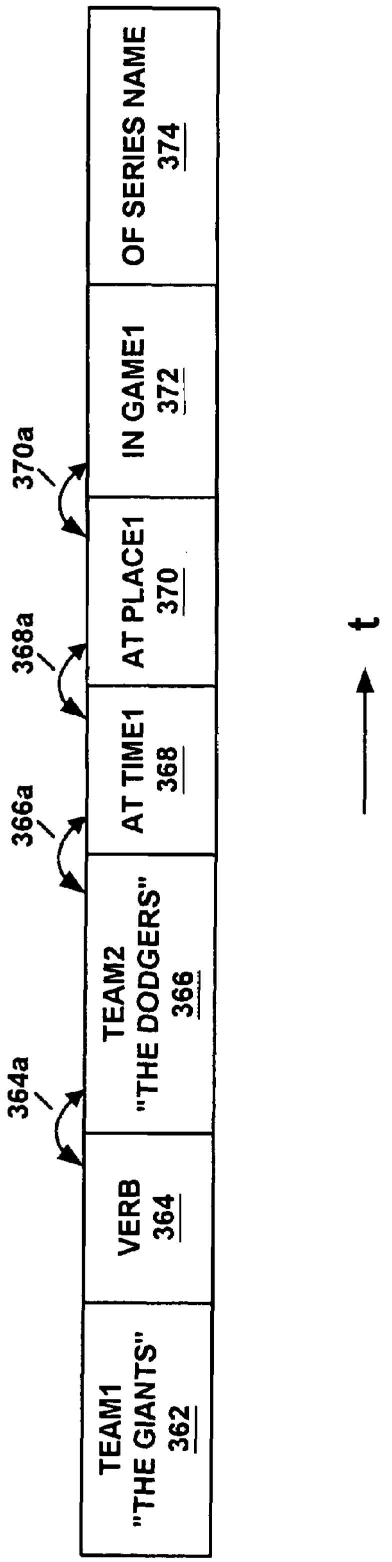
FIG. 4C is a timing diagram having the speech properties of FIG. 4A and FIG. 4B and used in an exemplary configuration for automatically generating and providing game information for upcoming sporting events.

FIG. 4C illustrates another phrase model 360 that can be used to report information about a game that is to be played in the future. The model 360 is generated using the techniques described with respect to FIG. 4A, FIG. 4B and FIG. 5. The model 360 includes the names of the teams, where they are to play and when they are to play. It also reports series information, if any. Co-articulation can be maintained at 364*a*, 366*a*, 368*a* and 370*a* in the manner described above. All recordings for segment 366 begin with "the." All recordings for segment 368 begin with "at." All recordings for segment 370 begin with "at." All recordings for segment 372 begin with "in." The verb 364 can be rotated to maintain freshness and a human sounding result. Segments 372 and 374 are optional. An example speech generated by model 360 is shown below:

"The Giants Meet the Dodgers at 5 pm at San Francisco in Game 2 of the World Series."

It is appreciated that any of the verbs selected can be rotated for changes in prosody. This is specially useful for important games and high scoring games when recordings having high energy and excitement can be used over average sounding recordings.

IV. Reducing Falsely Triggered Barge-Ins

An embodiment of the present invention is directed to a mechanism within an audio user interface for reducing the occurrences of falsely triggered barge-ins. A barge-in occurs when the user speaks over the service 100. The service 100 then attempts to process the user's speech to take some action. As a result, a service interrupt may occur, e.g., what ever the service was doing when the user spoke is terminated and the service takes some action in response to the speech. However, the user may have been speaking to a third party, and not to the service 100, or a barge-in could be triggered by other loud noises, e.g., door slams, another person talking, etc. As a result, the barge-in was falsely triggered. Falsely triggered barge-ins can become annoying to the user because they can interrupt the delivery of stories and other information content desired by the user. In order to replay the interrupted content, the menu must be navigated through again and the content is then replayed from the start, thereby forcing the user to listen again to information he/she already heard.

FIG. 9 illustrates a process 400 in accordance with an embodiment of the present invention for reducing the occurrences of falsely triggered barge-in events. FIG. 9 is described in conjunction with the timing diagram 425 of FIG. 10. Generally, this embodiment of the present invention provides a mode of operation that is particularly useful during periods of content delivery, e.g., when the service 100 is playing a news story or some content or other piece of information to the user that may take many seconds to even minutes to complete. During this content delivery period, only special words/commands can interrupt the content delivery, e.g., "stop," "go-back," or "tellme menu." Otherwise, audible signals or words from the user are ignored by the service 100 so as to not needlessly interrupt the delivery of the content. By using process 400, the service 100 can effectively filter out words that the user does not want to interrupt the content delivery.

Figure 10:
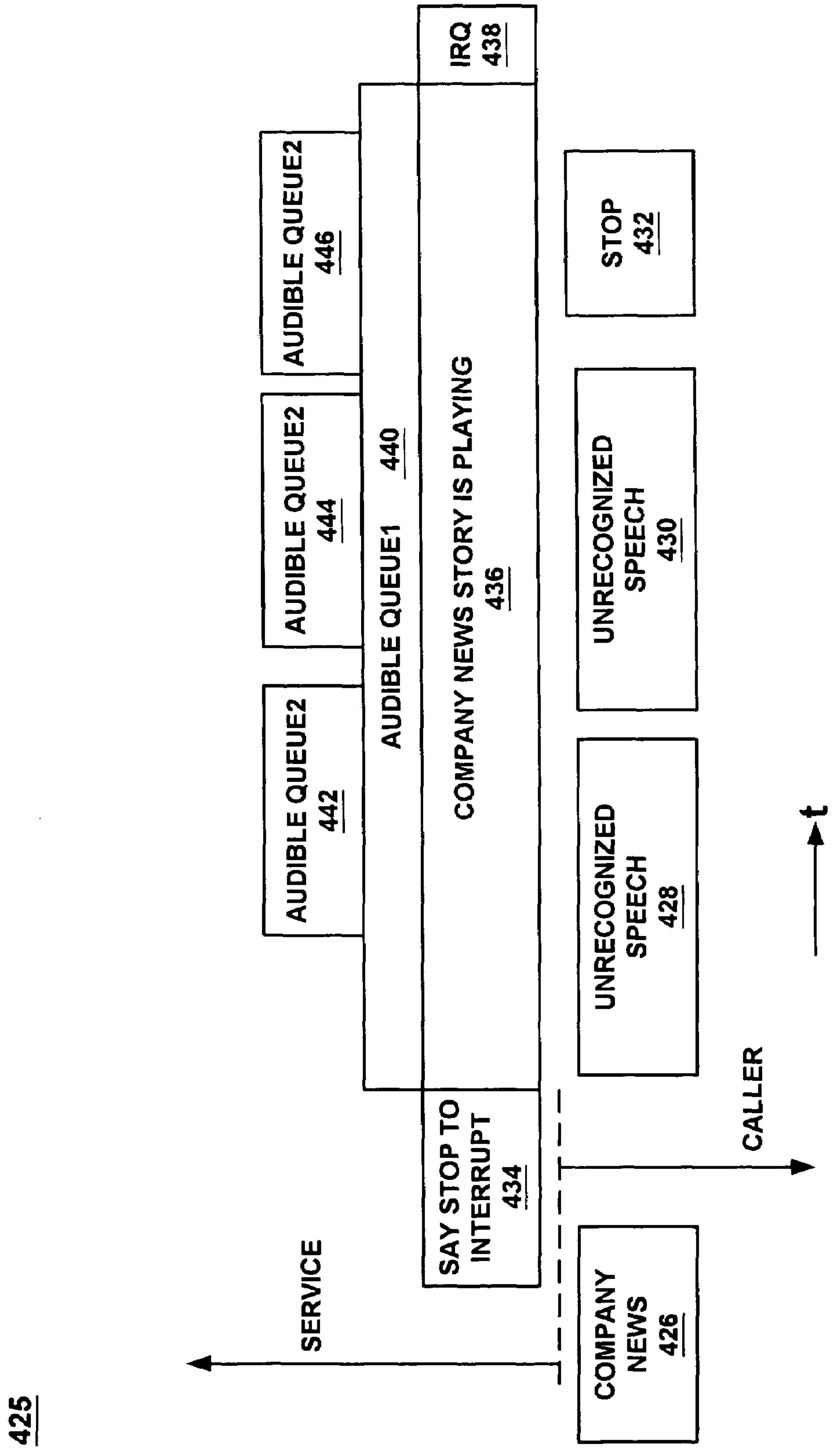
FIG. 10 is a timing diagram illustrating an exemplary scenario involving the process of FIG. 9.

Step 402 describes an exemplary mechanism that can invoke this embodiment of the present invention. At step 402, the user invokes a content delivery request. In one example, the user may select a news story to hear, e.g., in the news application. Alternatively, the user may request certain financial or company information to be played in the stocks application. Or, the user may request show times in the movies application. Any of a number of different content delivery requests can trigger this embodiment of the present invention. One exemplary request is shown in FIG. 10 where the command "company news" is given at 426. Blocks along this row (e.g., 426, 428, 430, and 432) represent the user's speech. Blocks above this row represent information played by the service 100.

At step 404 of FIG. 9, the service 100 cues the user with a message indicating that in order to stop or interrupt the content that is about to be played, he/she should say certain words, e.g., special words or "magic words." As one example, the service 100 would say, "Say stop to interrupt this report or message." In this case, "stop" is the special word. This message is represented as timing block 434 in FIG. 10 where "IRQ" represents interrupt. Step 404 is important, because the user is not able to interrupt the report or message with other words or commands apart from the special words and therefore must be made aware of them. In an alternative embodiment, the menu keyword (in addition to the special words) will always operate and be active to interrupt the content delivery. At step 406, after a short pause, the service 100 commences delivery of the requested content to the user, this is represented in FIG. 10 as timing block 436. On subsequent passes through step 406, the content delivery is continued. Also at step 406, the embodiment can optionally play a background audio cue signal 440 that informs the user that a special mode has been entered that only responds to special words. At step 410, if the user did not make a sound, then step 414 is entered. At step 414, if the content is not done, then step 406 is entered to continue playing the content and to continue to listen to the user.

At step 410, if the user spoke or made a sound (block 428 of FIG. 10), during content delivery, then step 412 is entered. At step 412, an optional audible sound can be rendered indicating that the service 100 heard the user and is currently processing the sound. This audible sound is represented as timing block 442 which is generated in response to user speech 428. The audible sound 442 generated by step 412 can also be a temporary lowering of the volume of the content delivery 436. At step 418, if the service 100 recognized the user utterance as a special word, then step 420 is entered, otherwise step 414 is entered. In this example, utterance 428 is not a special word, so step 414 is entered. At step 414, a check is made if the content has finished. If not, then step 406 is entered again where the content continues to play and the user is listened to again. It is appreciated that utterance 428 was ignored by the service 100 in the sense that the content delivery 436 was not interrupted by it. The optional audible tone 442 is light and also did not interrupt or disturb or override the content delivery 436. Utterance 430 is also processed in the same fashion as utterance 428. Optional audible tone 444 can be generated in response to utterance 430. Utterance 430 is ignored by the service 100 in the sense that content delivery 436 is not interrupted by it.

At step 410, a user utterance 432 is detected. Optional audible tone 446 is generated in response. At step 418, if the user did say a special word, e.g., timing block 432, then step 420 is entered. At step 420, the content is interrupted, as shown by interruption 438. Process 400 then returns to some other portion of the current application or to the menu structure. If the content delivery finishes, then at step 416 a cue message is played to indicate that the content is done and process 400 then returns to some other portion of the current application or to the menu structure. If the content completes or is interrupted, optional audio cue 440 also ends.

Process 400 effectively ignores user utterances and/or sounds, e.g., blocks 428 and 430, that do not match a special word. While processing these utterances, the content delivery is not interrupted by them. Using process 400, a user is not burdened with remaining silent on the call while the content is being rendered. This gives the user more freedom in being able to talk to others or react to the content being delivered without worrying about the content being interrupted.

V. Information Selection Based on Personalization

The following embodiments of the present invention personalize the delivery of content to the user in ways that do not burden the user in requiring them to enter certain information about themselves thereby making the audio user interface easier to use.

The process 450 of FIG. 11 represents one embodiment for selecting a location, e.g., a city and state, on which to report information of a particular category. The category can be any category within the scope of the present invention. An exemplary category, e.g., "movies," is selected for illustration only. Generally, process 450 obtains a default city and state based on some characteristic of the user, e.g., the caller ID (e.g., ANI) of the user. It is appreciated that the caller ID (e.g., ANI) can (1) map to a location or (2) it can be used to unlock a user profile which includes a location preference. The default city is assumed to be personal to the caller and probably the city and state on which the caller wants information reported. If the user wants information about the default, he/she need not say any city name but merely pause and the service 100 automatically provides information on this default city. However, the default city and state can be overridden by the user stating a new city and state. By providing a personalized default that can be overridden, the present invention facilitates the delivery of personalized information in an easy to use way while allowing the user the flexibility to select any other city or state.

At step 452, this embodiment of the present invention obtains a default city and state for the caller upon the caller entering a particular application, e.g., the movies application. This default city and state can be obtained from the last city and state selected by the same user, or, it can be selected based on the user's caller ID (e.g., ANI) (or caller ID-referenced profile preference). A message is played at step 452 that a particular city and state has been selected and that movie information is going to be rendered for that city. Assuming the default is San Jose, for example, the message can be, "Okay, let's look for movies in and around the city of San Jose, Calif."

At step 454, the service 100 plays a message that this default city can be overridden by the user actively stating another city and state. For instance, the message could be, "Or, to find out about movies in another area, just say its city and state." At step 456, cue music, analogous to step 264 (FIG. 2A) is played thereby giving the user an indication that a new selection may be made during the musical period and also reinforcing to the user that the service 100 is still there listening to him/her. During the cue music, the service 100 is listening to the user and will perform automatic voice recognition on any user utterance.

At step 458, if the user did not say a new city or state, e.g., remained silent during the cue music, then at step 460, information is rendered about movies in the default city. Process 450 then returns. However, if at step 458 the user did say a new city and state during the cue music, then this city becomes recognized and step 462 is entered. At step 462, information is rendered about movies in the new city. Process 450 then returns.

Therefore, process 450 provides an effective and efficient mechanism for information about a default city to be rendered, or alternatively, a new city can be selected during a short cue period. It is appreciated that if the user merely waits during the music cue period without saying anything, then information about his/her city will be played without the user ever having to mention a city or state.

Figure 12:
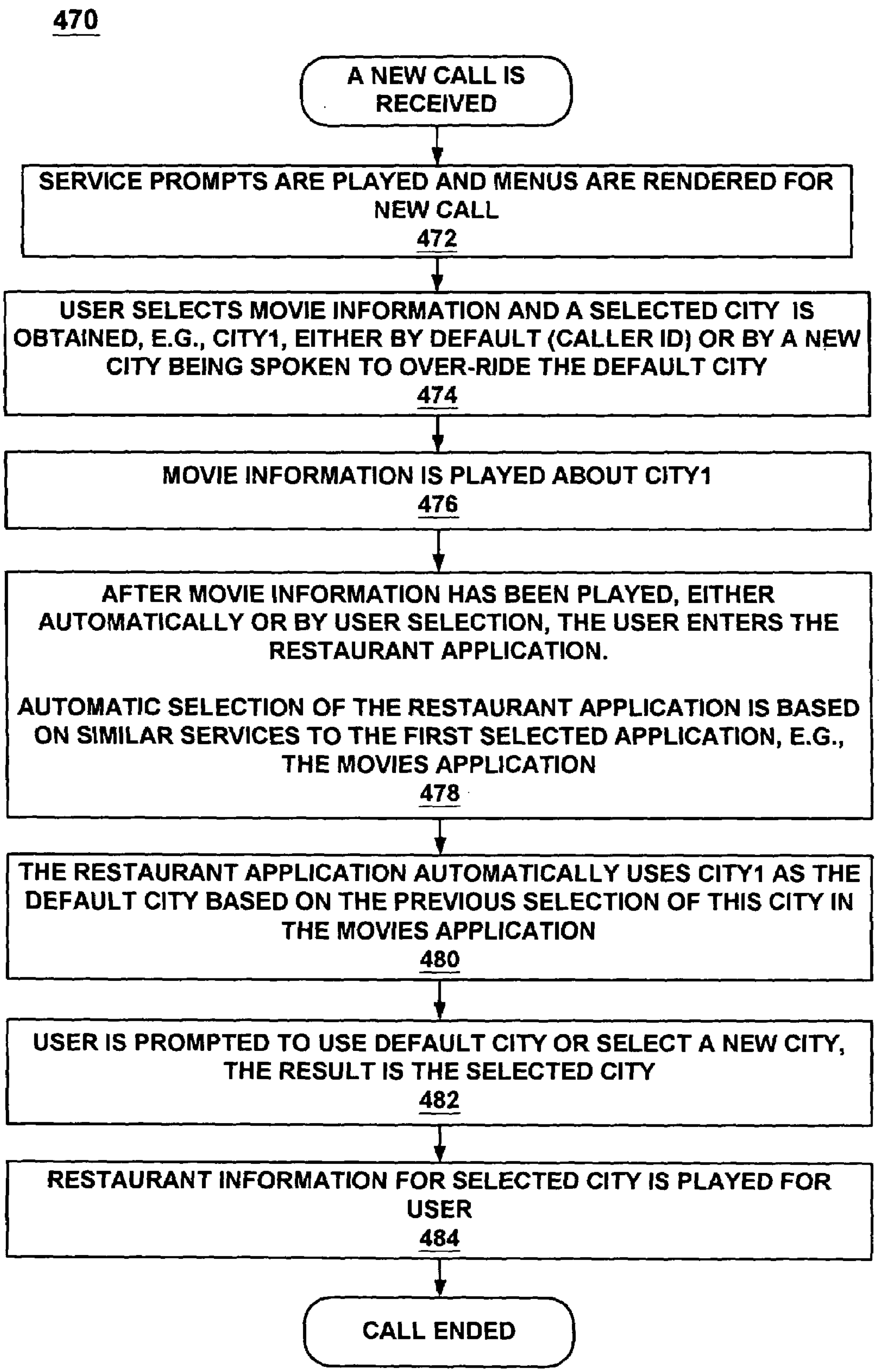
FIG. 12 is a flow diagram of steps in accordance with an embodiment of the present invention for selecting a city and state for reporting information thereon based on a previously selected city and state of another application or category of information.

FIG. 12 illustrates another embodiment of the present invention. In this embodiment, once the user obtains information regarding a first category, a second application is entered regarding a second category. The default for the second category is automatically selected based on the default or selection used for the first category. The second category can be selected by the user actively, or it can automatically be selected by the service 100. If the second category is automatically selected by the service 100, then it is typically related in some manner to the first category. An example is given below.

FIG. 12 illustrates process 470 that is based on an exemplary selection of categories. It is appreciated that this embodiment can operate equally well for any categories of information and the ones selected are exemplary only. At step 472, a new call is received and the service 100 gives the appropriate prompts and the menu is played. At step 474, the user selects a particular application, e.g., the movies application, and then a particular city and state are selected, e.g., by the user allowing the default city and state to be used (from caller ID (e.g., ANI)) or by selecting a new city and state. This city and state is called "city1." Step 474 can be performed in accordance with the steps of FIG. 11. At step 476, information about city1 is rendered to the user. In this example, it is movie information but could be any information.

At step 478 of FIG. 12, within the same call, the user either selects a second application, or alternatively, the service 100 automatically selects the second application. If the service 100 automatically selects the second application at step 478, then generally a second application is selected that has some relationship with the first application under some common category. In the example given in FIG. 12, the second application is the restaurant application. Movies and restaurants are associated because they are both involved with the category of entertainment. Therefore, people that want to get information regarding movies in a city may also want information regarding restaurants from the same city.

At step 480, the restaurant application utilizes the same city1 as used for the movies application to be its default city. At step 482, the user is cued that city1 is to be used for finding restaurant information, or they can select a different city by actively saying a new city and state. For instance, the message could be, "Okay, I'll find restaurant information for city1, or say another city and state." Then cue music is played for a short period of time (like step 456 of FIG. 11) giving the user an opportunity to change the default city. At step 482, either city1 will be used or the user will select a new city. Either way, the result is the selected city. At step 484, restaurant information regarding the selected city is rendered to the user.

Process 470 therefore allows automatic selection of a city based on a user's previous selection of that city for categories that are related. The second category can even be automatically entered or suggested by the service 100. The user's interface with the second application is therefore facilitated by his/her previous selection of a city in the first application. Assuming a caller enters the service 100 and requests movie information, if the default city is selected, then movie information is played without the user saying any city at all. After a brief pause, related information, e.g., about restaurants near the movie theater, can then automatically be presented to the user thereby facilitating the user planning an evening out. If the user changes the default city in the first application, then that same city is used as the default for the second application. Second application information can then be rendered to the user regarding the city of interest without the user saying any city at all. In this way, FIG. 12 provides a process 470 that personalizes the delivery of content to a user based on the user's prior selection and indication of a city.

VI. Detecting and Responding to Troublesome Voice Recognition

An embodiment of the present invention is specially adapted to detect conditions and events that indicate troublesome voice recognition. Poor voice recognition needs to be addressed effectively within an audio user interface because if left uncorrected it leads to user frustration.

Figure 13:
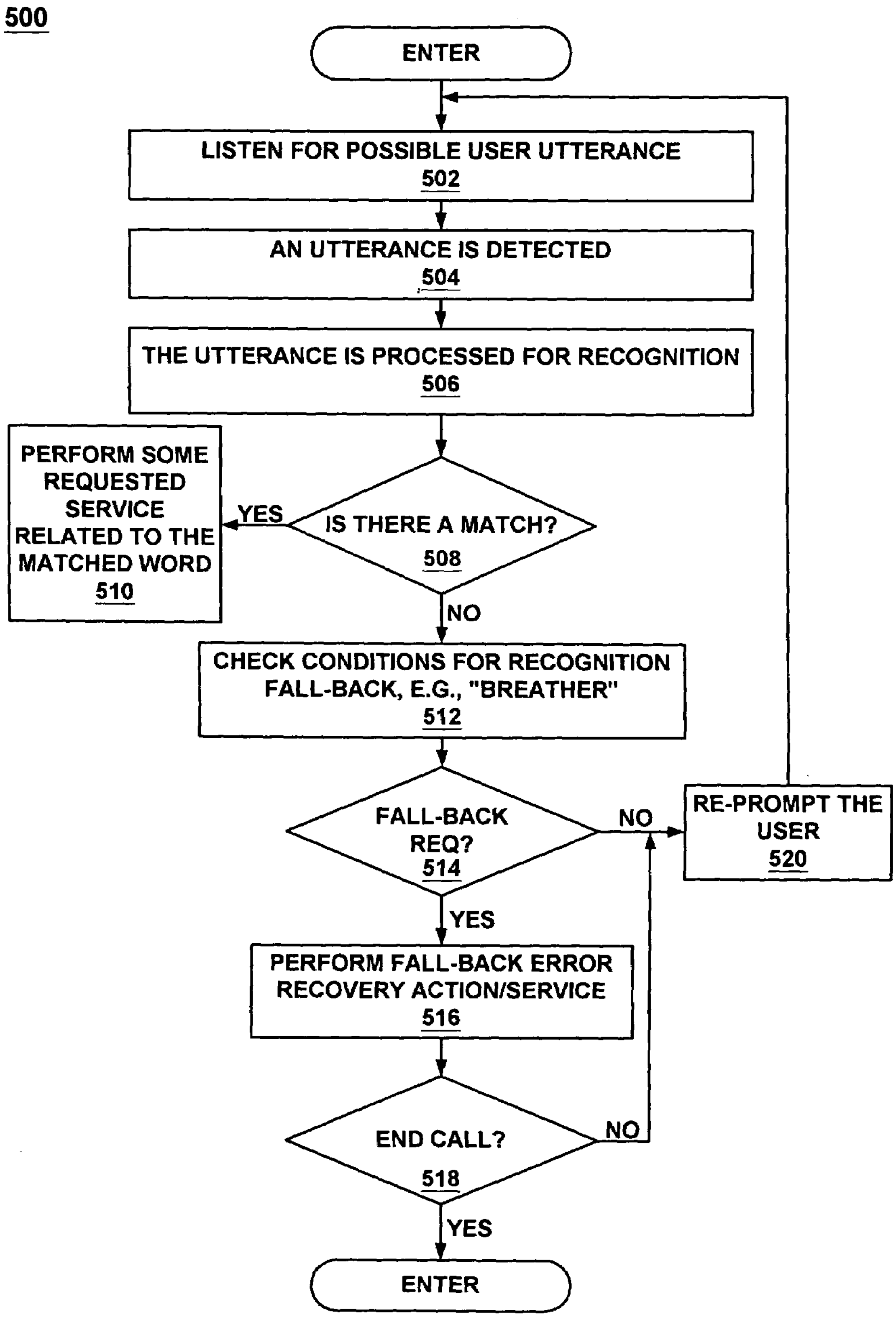
FIG. 13 is a flow diagram of steps in accordance with an embodiment of the present invention for providing services to deal with callers having trouble with voice recognition.

FIG. 13 illustrates an overall process 500 in accordance with an embodiment of the present invention for detecting and servicing, e.g., dealing with, poor voice recognition conditions or causes. The process 500 includes a special detection process 512 which is described in FIG. 14 and also a special service process 516 which is described in FIG. 15.

Process 500 can be employed by the audio user interface at any point where a user can say a command or keyword or special word. At step 502, the service 100 is listening for a possible user utterance or an audible signal. At step 504, it is assumed that a user utterance is received. An utterance is not recognized at step 504 until the sounds on the line exceed a particular threshold amount, or "barge-in" threshold. The barge-in threshold can be adjusted in accordance with the present invention as described further below. At step 506, the voice recognition processes of the service 100 are employed to process the detected utterance.

At step 508, if the utterance is processed and it matches a known keyword, special word or command, then step 510 is entered where the matched word performs some predetermined function. Process 500 then executes again to process a next user utterance. Otherwise, step 512 is entered because the user utterance could not be matched to a recognized word, e.g., a no match or mismatch condition. This may be due to a number of different poor voice recognition conditions or it may be due to an unrecognized keyword being spoken or it may be due to a transient environmental/user condition. At step 512, a special process is entered where the service 100 checks if a "breather" or "fall-back" process is required. A fall-back is a special service routine or error-recovery mechanism that attempts to correct for conditions or environments or user habits that can lead to poor voice recognition. If a fall-back is not required just yet, then step 520 is entered where the user is re-prompted to repeat the same utterance. A re-prompt is typically done if the service 100 determines that a transient problem probably caused the mismatch. The re-prompt can be something like, "Sorry, I didn't quite get that, could you repeat it." The prompt can be rotated in word choice and/or prosody to maintain freshness in the interface. Step 502 is then entered again.

At step 415, if the service 100 determines that a fall-back service 516 is required, then step 516 is entered where the fall-back services 516 are executed. Any of a number of different conditions can lead to a flag being set causing step 516 to be entered. After the fall-back service 516 is complete, step 518 is entered. If the call should be ended, e.g., no service can help the user, then at step 518 the call will be terminated. Otherwise, step 520 is entered after the fall-back service 516 is executed.

Figure 14:
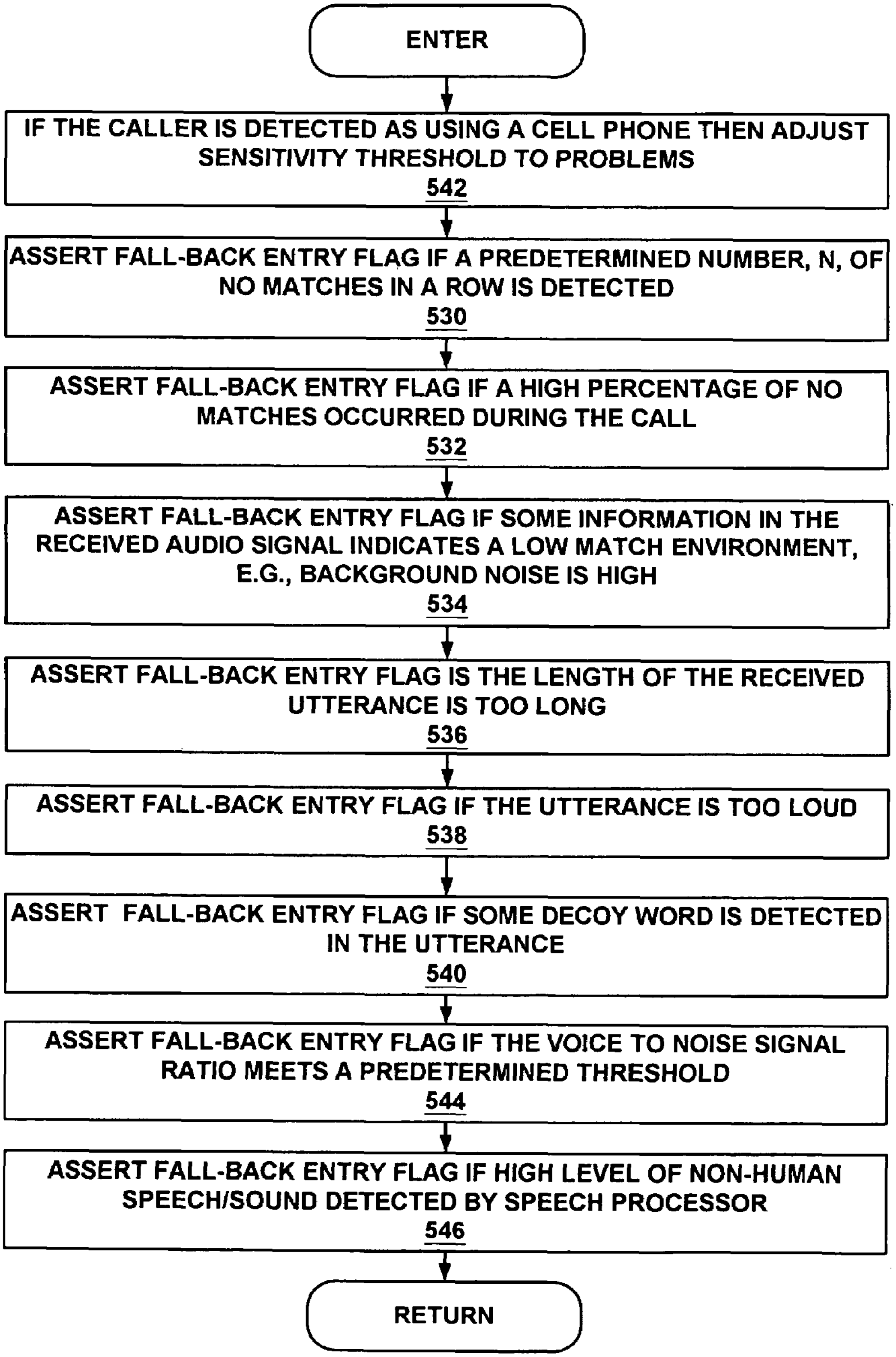
FIG. 14 is a flow diagram of steps in accordance with an embodiment of the present invention for determining when conditions are present that require services for callers having trouble with voice recognition.

Fall-back Entry Detection. FIG. 14 illustrates the steps of process 512 in more detail. Process 512 contains exemplary steps which test for conditions that can lead to a fall-back entry flag being set which will invoke the fall-back services of process 516. These conditions generally relate to or cause or are detected in conjunction with troublesome or poor voice recognition.

At step 542, the barge-in threshold (see step 504) is dynamically adjusted provided the caller is detected as being on a cell phone. Cell phone usage can be detected based on the Automatic Number Identification (ANI) signal associated with the caller. In many instances, cell phone use is an indication of a poor line or a call having poor reception. The use of a cell phone, alone, or in combination with any other condition described in process 512, can be grounds for setting the fall-back entry flag. However, by adjusting the barge-in threshold, the system's sensitivity to problems is adjusted. At step 542, based on the received ANI, a database lookup is done to determine if the call originated from a cell phone, if so the barge-in threshold is raised for that call. For sounds that are below a certain energy level (the "barge-in threshold"), the voice recognition engine will not be invoked at all. This improves recognition accuracy because cell phone calls typically have more spurious noises and worse signal-to-noise ratio than land line based calls.

Also at step 542, the present invention may raise the confidence rejection threshold for callers using cell phones. For instance, the voice recognition engine returns an ordered set of hypotheses of the spoken input, e.g., an ordered list of guesses as to what the speaker said, and a confidence level (numeric data) associated with each hypothesis. Increasing the confidence rejection threshold means, in effect that for cell phones, a higher confidence is needed associated with a hypothesis before it will be considered a spoken word to have been "matched." In particular, the service takes the highest confidence hypothesis above the rejection threshold and deems it a match and otherwise the recognition engine returns a no-match. Raising the confidence rejection threshold for callers using cell phones decreases the percentage of false matches and therefore improves recognition accuracy.

At step 530, the fall-back entry flag is set provided a predetermined number, n, of no matches occur in a row. In one embodiment n is four, but could be any number and could also be programmable. If step 530 sets the fall-back entry flag, then the n counter is reset. If n has not yet been reached, then the n counter is increased by one and step 530 does not set the fall-back entry flag.

At step 532, the fall-back entry flag is set provided a high percentage, P, of no matches occur with respect to all total user utterances, T, of a given call. Therefore, if a noisy environment or a strong accent leads to many no matches, but they do not necessarily happen to be in a row, then the fall-back entry flag can still be set by step 532. The particular threshold percentage, P, can be programmable.

At step 534, the fall-back entry flag is set provided some information is received in the audio signal that indicates a low match environment is present. For instance, if the background noise of the call is too high, e.g., above a predetermined threshold, then a noisy environment can be detected. In this case, the fall-back entry flag is set by step 534. Background noise is problematic because it makes it difficult to detect when the user's speech begins. Without knowing its starting point, it is difficult to discern the user's speech from other sounds. Further, if static is detected on the line, then the fall-back entry flag is set by step 534.

At step 536, the fall-back entry flag is set provided the received utterance is too long. In many instances, a long utterance indicates that the user is talking to a third party and is not talking to the service 100 at all because the recognized keywords, commands and special words of the service 100 are generally quite short in duration. Therefore, if the user utterance exceeds a threshold duration, then step 536 will set the fall-back entry flag.

At step 538, the fall-back entry flag is set provided the user utterance it too loud, e.g., the signal strength exceeds a predetermined signal threshold. Again, a loud utterance may be indicative that the user is not speaking to the service 100 at all but speaking to another party. Alternatively, a loud utterance may be indicative of a noisy environment or use of a cell phone or otherwise portable phone.

At step 540 of FIG. 14, the fall-back entry flag is set provided the voice recognition processes detect a decoy word. Decoy words are particular words that voice recognition systems recognize as grammatical garbage but arise often. Decoy words are what most random voices and speech sound like, e.g., side speech. When a predetermined number of decoy words are detected, then step 540 sets the fall-back entry flag.

At step 544, the fall-back entry flag is set provided the voice signal to noise ratio falls below a predetermined threshold or ratio. This is very similar to the detection of background noise. Noisy lines and environments make it very difficult to detect the start of the speech signal.

At step 546, the fall-back entry flag is set provided the voice recognition processes detect that a large percentage of non-human speech or sounds are being detected. It is appreciated that if any one step detects that a fall-back entry flag should be set, one or more of the other processes may or may not need to be executed. It is appreciated that one or more of the steps shown in FIG. 14 can be optional.

Figure 15:
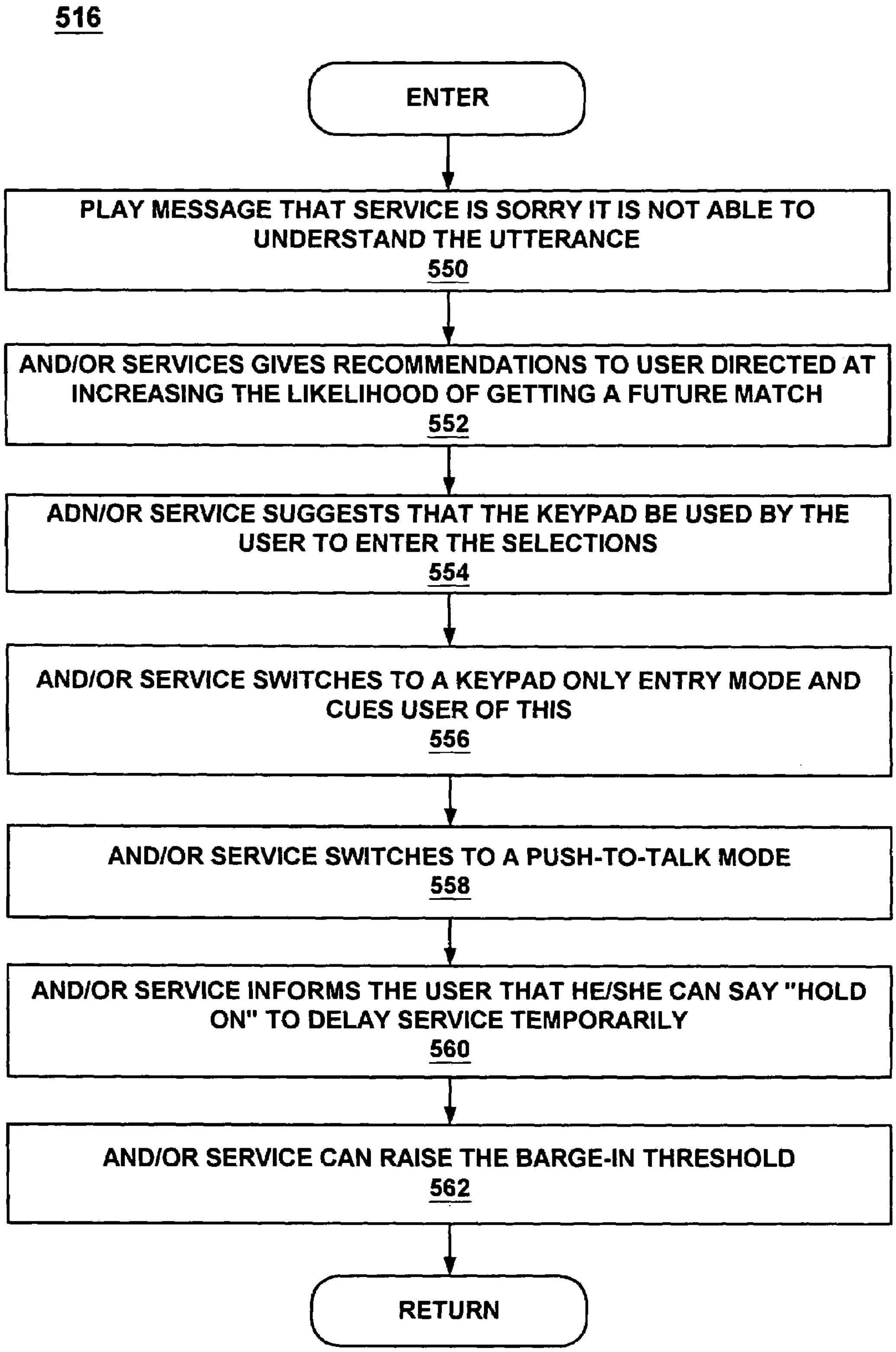
FIG. 15 is a flow diagram of steps in accordance with an embodiment of the present invention for providing services to a caller having trouble with voice recognition.

Fall-back Services. FIG. 15 illustrates exemplary fall-back services that can be performed in response to a fall-back entry flag being set. At step 550, a message can be played by the service 100 that it is sorry, but it is not able to understand the user or is having trouble understanding what the user is saying. This message can be rotated in word selection and prosody. At step 552, the service 100 can give some helpful hints or tips or suggestions to the user on how to increase the likelihood that he/she will be understood. For instance, at step 552, the service 100 may say to the user that he/she should speak more clearly, slowly, directly, etc. The suggestions can be directed at particular conditions that set the fall-back entry flag. For instance, a suggestion could be for the user to speak less loudly assuming this event triggered the fall-back entry flag.

At step 554, the service 100 may suggest to the user that they use the keypad (touch-tone) to enter their selections instead of using voice entry. In this mode, messages and cues are given that indicate which keys to press to cause particular events and applications to be invoked. For instance, a message may say, "Say movies or press 2 to get information about movies." Or, a message may say, "Say a city or state or type in a ZIP code." In this mode, messages are changed so that the keypad can be used, but voice recognition is still active.

At step 556 of FIG. 15, the service 100 may switch to a keypad (touch-tone) only entry mode where the user needs to use the keypad to enter their commands and keywords. In this mode, automatic voice recognition is disabled and the service messages are changed accordingly to provide a keypad only navigation and data entry scheme. Step 554 is usually tried if step 552 fails.

At step 558, the service 100 may switch to a push-to-talk mode. In this mode, the user must press a key (any designated key) on the keypad just before speaking a command, keyword or special word. In noisy environments, this gives the automatic voice recognition processes a cue to discern the start of the user's voice. Push-to-talk mode can increase the likelihood that the user's voice is understood in many different environments. In this mode, it is appreciated that the user does not have to maintain the key pressed throughout the duration of the speech, only at the start of it. Push-to-talk mode is active while the service 100 is giving the user messages and cues. Typically in push-to-talk mode, the service 100 stops what ever signal it is rendering to the user when the key is pressed so as to not interfere with the user's voice.

At step 560, the service 100 may inform the user that they can say "hold on" to temporarily suspend the service 100. This is useful if the user is engaged in another activity and needs a few moments to delay the service 100. At step 562, the service 100 can raise the barge-in threshold. The barge-in threshold is a volume or signal threshold that the service 100 detects as corresponding to a user keyword, command or special word. If this threshold is raised, then in some instances it becomes harder for noise and background signals to be processed as human speech because these signals may not clear the barge-in threshold. This step can be performed in conjunction with a message informing the user to speak louder.

It is appreciated that process 516 may execute one or more of the steps 552-562 outlined above, or may execute only one of the steps. When rendered active, process 516 may execute two or more, or three or more, or four or more, etc. of the steps 552-562 at any given time.

VII. Automatic User Address Recovery

One very important task to perform with respect to electronic or computer controlled commerce is to reliably obtain or recover the address and name of the users and callers to the service 100. However, it is much more efficient to automatically obtain the address than to utilize an operator because human intervention typically increases system and operational costs. This embodiment of the present invention provides a framework for automatically obtaining a user's address when they call a computerized service that offers an audio user interface. Several different methods are employed to obtain the address in the most cost effective manner. Generally, automatic methods are employed first and human or operator involved methods are used last.

Figure 16:
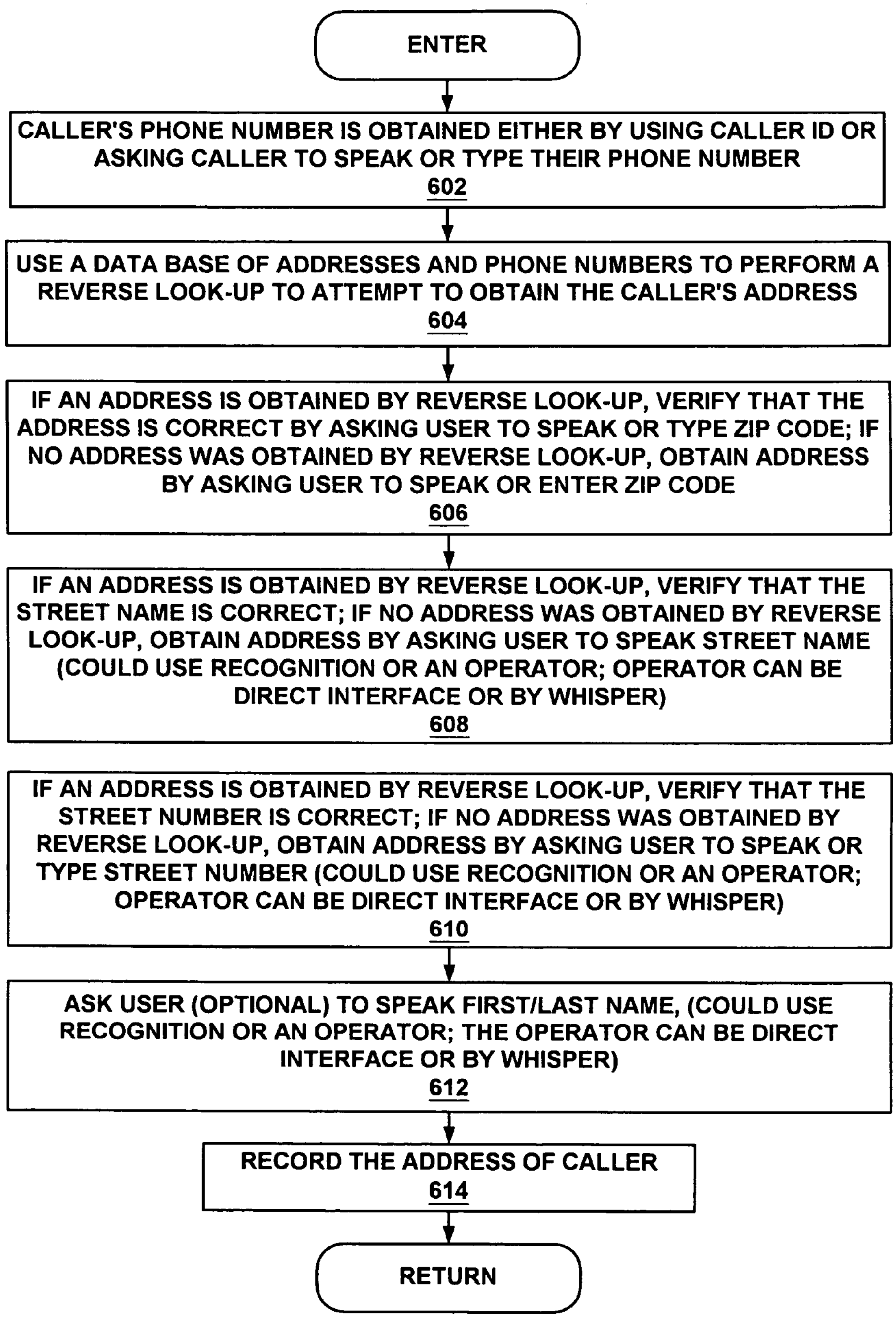
FIG. 16 is a flow diagram of steps in accordance with an embodiment of the present invention for automatically obtaining address information regarding a caller.

FIG. 16 illustrates a computer implemented process 600 whereby the address of a caller can automatically be obtained by the service 100. At step 602, the user's phone number is obtained by the system. This can be accomplished by using the caller ID (e.g., ANI) of a caller (e.g., this type of data is typically included within the standard caller ID data structure), or by asking the caller to enter his/her phone number using the keypad or by speaking the numbers to a voice recognition system. If all of these methods fail to obtain the phone number of the caller, then a human operator can be used at step 602 to obtain the phone number either by direct interface or using a whisper technique.

At step 604, provided the caller's phone number was obtained, the service 100 performs a reverse look-up through electronic phone books using the phone number to locate the caller's address. In many cases, e.g., about 60 percent, this process will produce an address for the caller. If the caller does not offer caller ID information and/or the electronic phone books do not have an address or phone number entry for the particular caller, then no address is made available from step 604.

At step 606, if an address is made available from step 604, then the user is asked for his/her zip code to verify the obtained address. If no address was made available from step 604, then the user is asked for his/her zip code at step 606 in an effort to obtain the address from the user directly. In either event, the user is asked for the zip code information at step 606. The zip code can be entered using the keypad, or by speaking the numbers to a voice recognition engine. If all of these methods fail to obtain the zip code of the caller, then a human operator can be used at step 606 to obtain the zip code either by direct interface or using a whisper technique. If step 604 produced an address and this address is verified by the zip code entered at step 606, then step 612 may be directly entered in one embodiment of the present invention entered. By involving the user in the verification step, this is an example of assisted recognition. Under this embodiment, if zip code verification checks out okay, then at step 614, the address is recorded and tagged as associated with the caller. Process 600 then returns because the address was obtained. The address can then be used to perform other functions, such as electronic or computer controlled commerce applications. If zip code verification fails, then step 608 is entered.

In the preferred embodiment, if the zip code from the user matches the zip code obtained from the reverse look-up process, the user is additionally asked to verify the entire address. In this option, the service 100 may read an address portion to the user and then prompt him/her to verify that this address is correct by selecting a "yes" or "no" option. At step 608, if the reverse look-up process obtained an address, the user is asked to verify the street name. If no address was obtained by reverse look-up, then the user is asked to speak his/her street name. The street name is obtained by the user speaking the name to a voice recognition engine. If this method fails to obtain the street name of the caller, then a human operator can be used at step 608 to obtain the street name either by direct interface or using a whisper technique.

At step 610, if the reverse look-up process obtained an address, the user is asked to verify the street number. If no address was obtained by reverse look-up, at step 610, the user is asked to speak his/her street number. The street number can be entered using the keypad, or by speaking the numbers to a voice recognition engine. If all of these methods fail to obtain the street number of the caller, then a human operator can be used at step 610 to obtain the street number either by direct interface or using a whisper technique.

At step 612, the user is optionally asked to speak his name, first name and then last name typically. The user name is obtained by the user speaking the name to a voice recognition engine. If this method fails to obtain the user name of the caller, then a human operator can be used at step 612 to obtain the user name either by direct interface or using a whisper technique.

It is appreciated that at any step, if automatic voice recognition tools fail to obtain any address information, the user may be asked to say his/her address over the audio user interface and an operator can be applied to obtain the address, e.g., an operator is used. In these cases, there are two ways in which an operator can be used. The service 100 can ask the caller for certain specific information, like street address, city, state, etc., and these speech segments can then be recorded and sent to an operator, e.g., "whispered" to an operator. The operator then types out the segments in text and relays them back to the service 100 which compiles the caller's address therefrom. In this embodiment, the user never actually talks to the operator and never knows that an operator is involved. Alternatively, the user can be placed into direct contact with an operator which then takes down the address. At the completion of step 614, an address is assumed to be obtained. It is appreciated that operator invention is used as a last resort in process 600 because it is an expensive way to obtain the address.

The following additional techniques can be used to improve the speech recognition engine. Sub-phrase-specific coarticulation modeling can be used to improve accuracy. People tend to slur together parts of phone numbers, for instance, the area code, the exchange, and the final four digits. While one might model the coarticulation between all digits, this approach is 1) not really right since someone is unlikely to slur the transitions between, say, the area code and the exchange and 2) inefficient since one must list out every possible "word" (=1,000,000 "words") with US NANP (North American Number Plan) 10-digit phone #s. Therefore, sub-phrase-specific coarticulation modeling is used.

A method of representing pure phonetic strings in grammars that do not allow phonetic input. Some speech recognizers require all phonetic dictionaries to be loaded at start-up time, so that it is impossible to add new pronunciations at runtime. A method of representing phonemes is proposed whereby phonetic symbols are represented as "fake" words that can be strung together so that the recognizer interprets them as if a textual word had been looked up in the dictionary. For example, "david" would be represented as:

"d-phoneme_ey-phoneme_v-phoneme_ih-phoneme_d-phoneme".

The dictionary would look like d-phoneme d
ey-phoneme aj
v-phoneme v
ih-phoneme I Thus, words that need to be added at runtime are run through an offline batch-process pronunciation generator and added to the grammar in the "fake" format above.

The preferred embodiment of the present invention, improvements, advanced features and mechanisms for a data processing system having an audio user interface, is thus described. While the present invention has been described in particular embodiments, it should be appreciated that the present invention should not be construed as limited by such embodiments, but rather construed according to the below claims.

What is claimed is:

1. A computer implemented method for providing services for a processing system using an audio interface, said method comprising:

rendering a first name recording at an audio interface;

selecting a verb based on subject matter contained within a remainder of said phrase;

rendering a recording of said verb at the audio interface;

rendering a second name recording at the audio interface, wherein said second name recording commences with a predetermined word and wherein said verb recording is recorded such that its termination contains proper co-articulation for said predetermined word; and rendering said remainder of said phrase at the audio interface, wherein said rendering said remainder includes:

rendering a first value associated with said first name; and rendering a second value associated with said second name, and wherein said verb is selected based on a difference between said first and second values.

2. A method as described in claim 1 wherein said verb recording is made by first recording said verb followed by said predetermined word, then eliminating said predetermined word from said verb recording but leaving behind said proper co-articulation.

3. A method as described in claim 1 wherein said first and second values comprise numerical values.

4. A method as described in claim 1 wherein said rendering said remainder further comprises rendering real-time, game duration information.

5. A method as described in claim 1 wherein said verb comprises selecting said verb based on subject matter contained within said remainder and also based on a play status of a game, wherein said play status comprises game in-play or game over.

6. A method as described in claim 1 wherein said first and second names are sports teams and wherein said subject matter contained within said remainder of said phrase comprises to a score of a game between said teams.

7. A method as described in claim 6 wherein said remainder of said phrase further comprises series summary information regarding a sport associated with said sports teams.

8. A method comprising:

providing a first speech segment, at an audio interface, a first value being associated with the first speech segment;

providing a second speech segment at the audio interface, a second value being associated with the second speech segment;

selecting a stored verb based on the first and second values;

concatenating the first speech segment, the selected verb, and the second speech segment to form a phrase using co-articulation between the selected verb and the second speech segment;

providing the concatenated phrase at the audio interface.

9. The method of claim 8, wherein the selecting the stored verb comprises selecting the stored verb based on an amount that the first and second values differ.

10. The method of claim 8, wherein the phrase is related to an event, and the selecting the stored verb is further based on whether the event is occurring or has occurred.

11. The method of claim 8, wherein the selecting the stored verb comprises selecting the stored verb based on a degree of difference between the first and second values.

12. The method of claim 8, wherein the using the co-articulation comprises including a phoneme between the selected verb and the second speech segment.

13. The method of claim 8, further comprising: providing the first value at the audio interface.

14. The method of claim 13, further comprising: providing the second value at the audio interface.

15. The method of claim 8, wherein the second speech segment includes a definite article, and the co-articulating comprises recording the stored verb together with the definite article.

16. The method of claim 15, the co-articulating further comprising: separating the recorded verb from the recorded definite article to form the stored verb.

17. The method of claim 8, wherein a tense of the selected verb corresponds to an event that is occurring or has occurred.

18. The method of claim 17, wherein the first speech segment identifies a first participant in the event and the second speech segment identifies a second participant in the event.

19. The method of claim 17, wherein the first and second values correspond to a state of the event.

20. A system comprising:

means for comparing a first value associated with a first speech segment to a second value associated with a second speech segment;

means for selecting a recorded verb based on the comparison of the first and second values;

means for co-articulating the recorded verb and a recorded voice segment, the recorded voice segment including a leading phoneme and the recorded verb having been formed from uttering the verb and the leading phoneme together;

means for concatenating the first speech segment, the second speech segment, and the co-articulated verb and voice segment to form a phrase; and means for rendering the phrase at an audio interface.

* * * * *